US011929035B2

(12) United States Patent
Kim et al.

(10) Patent No.: US 11,929,035 B2
(45) **Date of Patent: *Mar. 12, 2024**

(54) DISPLAY DEVICE INCLUDING A DATA-SCAN INTEGRATION CHIP

(71) Applicant: Samsung Display Co., Ltd., Yongin-si (KR)

(72) Inventors: Jiwoong Kim, Suwon-si (KR); Jaekeun Lim, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/939,357

(22) Filed: Sep. 7, 2022

(65) Prior Publication Data

US 2022/0415262 A1 Dec. 29, 2022

Related U.S. Application Data

(63) Continuation of application No. 17/217,293, filed on Mar. 30, 2021, now Pat. No. 11,468,847.

(30) Foreign Application Priority Data

Jul. 23, 2020 (KR) ........................ 10-2020-0091905

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0278* (2013.01); *G09G 2310/0289* (2013.01); *G09G 2310/08* (2013.01)

(58) Field of Classification Search
CPC ............... G09G 3/3275; G09G 3/3266; G09G 2310/0289; G09G 2310/08; G09G 2310/027; G09G 2310/0278
See application file for complete search history.

(56) References Cited

U.S. PATENT DOCUMENTS 9,691,791 B2 6/2017 Jeon et al.
10,403,198 B2 9/2019 Kim et al.
11,468,847 B2 * 10/2022 Kim ..................... G09G 3/3266
2008/0170028 A1 * 7/2008 Yoshida ................... G09G 3/20
345/100

(Continued)

*Primary Examiner* — Nelson M Rosario
(74) *Attorney, Agent, or Firm* — CANTOR COLBURN LLP

(57) ABSTRACT

A display device includes a display panel including a plurality of pixels, a plurality of data lines extending in a first direction and coupled to the plurality of pixels, a plurality of first scan lines extending in a second direction different from the first direction and coupled to the plurality of pixels, and a plurality of second scan lines extending in the first direction and coupled to the plurality of first scan lines, a data driver which provides data voltages to the plurality of pixels through the plurality of data lines, and a scan driver which sequentially provides a scan signal to the plurality of pixels on a row-by-row basis through the plurality of second scan lines and the plurality of first scan lines. The data driver and the scan driver are implemented with a data-scan integration chip which outputs the data voltages and the scan signal.

14 Claims, 14 Drawing Sheets

(56) References Cited

U.S. PATENT DOCUMENTS

| | | | | |
|---|---|---|---|---|
| 2010/0020053 | A1* | 1/2010 | Sah | G09G 3/3674 345/87 |
| 2012/0169783 | A1* | 7/2012 | Park | G09G 3/3614 345/690 |
| 2012/0188216 | A1 | 7/2012 | Gu et al. | |
| 2014/0132495 | A1 | 5/2014 | Kang | |
| 2014/0284562 | A1 | 9/2014 | Hur et al. | |
| 2014/0347404 | A1 | 11/2014 | Lee et al. | |
| 2015/0015553 | A1 | 1/2015 | Cho et al. | |
| 2015/0103060 | A1* | 4/2015 | Yamashita | G09G 3/3266 345/76 |
| 2015/0161960 | A1 | 6/2015 | Park et al. | |
| 2015/0243254 | A1 | 8/2015 | Choi | |
| 2016/0035307 | A1 | 2/2016 | Jeon et al. | |
| 2016/0086563 | A1 | 3/2016 | Park et al. | |
| 2016/0351586 | A1 | 12/2016 | Seo | |
| 2017/0084228 | A1 | 3/2017 | Kwak | |
| 2017/0358258 | A1 | 12/2017 | Kim et al. | |

* cited by examiner

DISPLAY DEVICE INCLUDING A DATA-SCAN INTEGRATION CHIP

This application is a continuation of U.S. patent application Ser. No. 17/217,293, filed on Mar. 30, 2021, which claims priority to Korean Patent Application No. 10-2020-0091905, filed on Jul. 23, 2020, and all the benefits accruing therefrom under 35 U.S.C. § 119, the content of which in its entirety is herein incorporated by reference.

BACKGROUND

1. Field

Embodiments of the invention relate to a display device, and more particularly to a display device including a data-scan integration chip.

2. Description of the Related Art

A display device may include a display panel that includes a plurality of pixels, a scan driver that provides a scan signal to a selected row of pixels among the plurality of pixels through a selected scan line among a plurality of scan lines, and a data driver that provides data voltages to the selected row of pixels through a plurality of data lines. The selected row of pixels may store the data voltages provided by the data driver while receiving the scan signal, and may emit light based on the stored data voltages.

SUMMARY

In a display device, a scan driver may be located at a first side of a display panel, and a data driver may be located at a second side of the display panel different from the first side, such that the reduction of a bezel width of the display panel may be limited.

Embodiments of the invention provide a display device where a data driver and a scan driver are located at a same side of a display panel and are implemented with a data-scan integration chip.

According to an embodiment, a display device includes a display panel including a plurality of pixels, a plurality of data lines extending in a first direction and coupled to the plurality of pixels, a plurality of first scan lines extending in a second direction different from the first direction and coupled to the plurality of pixels, and a plurality of second scan lines extending in the first direction and coupled to the plurality of first scan lines, a data driver which provides data voltages to the plurality of pixels through the plurality of data lines, and a scan driver which sequentially provides a scan signal to the plurality of pixels on a row-by-row basis through the plurality of second scan lines and the plurality of first scan lines. In such an embodiment, the data driver and the scan driver are implemented with a data-scan integration chip which outputs the data voltages and the scan signal.

In an embodiment, at least one data line of the plurality of data lines may be disposed between adjacent two second scan lines of the plurality of second scan lines.

In an embodiment, the data-scan integration chip may include a plurality of data output pads coupled to the plurality of data lines, and a plurality of scan output pads coupled to the plurality of second scan lines.

In an embodiment, at least one data output pad of the plurality of data output pads may be disposed between adjacent two scan output pads of the plurality of scan output pads.

In an embodiment, in a first period, the data-scan integration chip may output the data voltages for a selected row of pixels among the plurality of pixels to the plurality of data lines. In such an embodiment, in a second period after the first period, the data-scan integration chip may make the plurality of data lines be floated, and may output the scan signal to a second scan line corresponding to the selected row among the plurality of second scan lines.

In an embodiment, the data voltages may be charged at the plurality of data lines during the first period, and the data voltages charged at the plurality of data lines may be stored in the selected row of pixels during the second period.

In an embodiment, the data-scan integration chip may include a first shift register which generates a sampling signal based on a data clock signal, a latch array which stores image data in response to the sampling signal, a first level shifter array which shifts voltage levels of latch output signals output from the latch array, a digital-to-analog converter array which performs a digital-to-analog conversion operation on shifter output signals output from the first level shifter array, a first output buffer array which outputs, as the data voltages, converter output signals output from the digital-to-analog converter array, a plurality of data output pads coupled to the plurality of data lines, a data output switch array which selectively couples the first output buffer array to the plurality of data output pads in response to a selection signal, a second shift register which generates the scan signal based on a scan clock signal, a second level shifter array which shifts a voltage level of the scan signal output from the second shift register, a second output buffer array which outputs the scan signal output from the second level shifter array, and a plurality of scan output pads coupled to the second output buffer array and the plurality of second scan lines.

In an embodiment, at least one component of the data-scan integration chip may be shared by the data driver and the scan driver.

In an embodiment, the data-scan integration chip may include a first shift register, a latch array, a digital-to-analog converter array and a first output buffer array for the data driver, the data-scan integration chip may further include a second shift register and a second output buffer array for the scan driver, and the data-scan integration chip may further include a shared level shifter array that is shared by the data driver and the scan driver.

In an embodiment, the shared level shifter array may include a plurality of level shifters, a shifter input switch array which couples output terminals of the latch array to input terminals of the plurality of level shifters in response to a selection signal, and couples output terminals of the second shift register to the input terminals of the plurality of level shifters in response to an inverted selection signal, and a shifter output switch array which couples output terminals of the plurality of level shifters to input terminals of the digital-to-analog converter array in response to the selection signal, and couples the output terminals of the plurality of level shifters to input terminals of the second output buffer array in response to the inverted selection signal.

In an embodiment, the shared level shifter array may further include a first shifter high power supply switch which transfers a data shifter high power supply voltage to a high power supply line of the shared level shifter array in response to the selection signal, a second shifter high power supply switch which transfers a scan shifter high power supply voltage to the high power supply line of the shared level shifter array in response to the inverted selection signal, a first shifter low power supply switch which transfers a data shifter low power supply voltage to a low power supply line of the shared level shifter array in response to the selection signal, and a second shifter low power supply switch which transfers a scan shifter low power supply voltage to the low power supply line of the shared level shifter array in response to the inverted selection signal.

In an embodiment, the data-scan integration chip may include a first shift register, a latch array, a first level shifter array and a digital-to-analog converter array for the data driver, the data-scan integration chip may further include a second shift register and a second level shifter array for the scan driver, and the data-scan integration chip may further include a shared output buffer array which is shared by the data driver and the scan driver.

In an embodiment, the data-scan integration chip may further include a plurality of data output pads coupled to the plurality of data lines, and a plurality of scan output pads coupled to the plurality of second scan lines. In such an embodiment, the shared output buffer array include a plurality of output buffers, a buffer input switch array which couples output terminals of the digital-to-analog converter array to input terminals of the plurality of output buffers in response to a selection signal, and couples output terminals of the second level shifter array to the input terminals of the plurality of output buffers in response to an inverted selection signal, and a buffer output switch array which couples output terminals of the plurality of output buffers to the plurality of data output pads in response to the selection signal, and couples the output terminals of the plurality of output buffers to the plurality of scan output pads in response to the inverted selection signal.

In an embodiment, a voltage level of a high power supply voltage of the plurality of output buffers may be determined as a voltage level of a higher one of a data buffer high power supply voltage and a scan buffer high power supply voltage, and a voltage level of a low power supply voltage of the plurality of output buffers may be determined as a voltage level of a lower one of a data buffer low power supply voltage and a scan buffer low power supply voltage.

In an embodiment, the data-scan integration chip may include a first shift register, a latch array and a digital-to-analog converter array for the data driver, the data-scan integration chip may further include a second shift register for the scan driver, and the data-scan integration chip may further include a shared level shifter array and a shared output buffer array which are shared by the data driver and the scan driver.

In an embodiment, the data-scan integration chip may further include a plurality of data output pads coupled to the plurality of data lines, and a plurality of scan output pads coupled to the plurality of second scan lines. In such an embodiment, the shared level shifter array may include a plurality of level shifters, a shifter input switch array which couples output terminals of the latch array to input terminals of the plurality of level shifters in response to a selection signal, and couples output terminals of the second shift register to the input terminals of the plurality of level shifters in response to an inverted selection signal, and a shifter output switch array which couples output terminals of the plurality of level shifters to input terminals of the digital-to-analog converter array in response to the selection signal, and couples the output terminals of the plurality of level shifters to input terminals of the shared output buffer array in response to the inverted selection signal. In such an embodiment, the shared output buffer array may include a plurality of output buffers, a buffer input switch array which couples output terminals of the digital-to-analog converter array to input terminals of the plurality of output buffers in response to the selection signal, and couples output terminals of the shared level shifter array to the input terminals of the plurality of output buffers in response to the inverted selection signal, and a buffer output switch array which couples output terminals of the plurality of output buffers to the plurality of data output pads in response to the selection signal, and couples the output terminals of the plurality of output buffers to the plurality of scan output pads in response to the inverted selection signal.

According to an embodiment, a display device includes a display panel including a plurality of pixels, a plurality of data lines extending in a first direction and coupled to the plurality of pixels, a plurality of first scan lines extending in a second direction different from the first direction and coupled to the plurality of pixels, and a plurality of second scan lines extending in the first direction and coupled to the plurality of first scan lines, a data driver which provides data voltages to the plurality of pixels through the plurality of data lines, and a scan driver which sequentially provides a scan signal to the plurality of pixels on a row-by-row basis through the plurality of second scan lines and the plurality of first scan lines. In such an embodiment, the data driver and the scan driver are implemented with a data-scan integration chip that outputs the data voltages and the scan signal, and at least one component of the data-scan integration chip is shared by the data driver and the scan driver.

In an embodiment, the at least one component shared by the data driver and the scan driver may include a shared level shifter array.

In an embodiment, the at least one component shared by the data driver and the scan driver may include a shared output buffer array.

In an embodiment, the at least one component shared by the data driver and the scan driver may include a shared output buffer array and a shared output buffer array.

As described above, in embodiments of a display device according to the invention, a data driver and a scan driver may be located at a same side of a display panel, such that a bezel width of the display panel may be reduced.

In embodiments of the display device according to the invention, the data driver and the scan driver may be implemented with a data-scan integration chip, such that a chip size or an integrated chip ("IC") size of a chip or an IC for driving the display panel may be reduced.

In embodiments of the display device according to the invention, at least one component (e.g., a level shifter array and/or an output buffer array) of the data-scan integration chip may be shared by the data driver and the scan driver, such that the chip size or the IC size of the chip or the IC for driving the display panel may be further reduced, and power consumption may be reduced.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
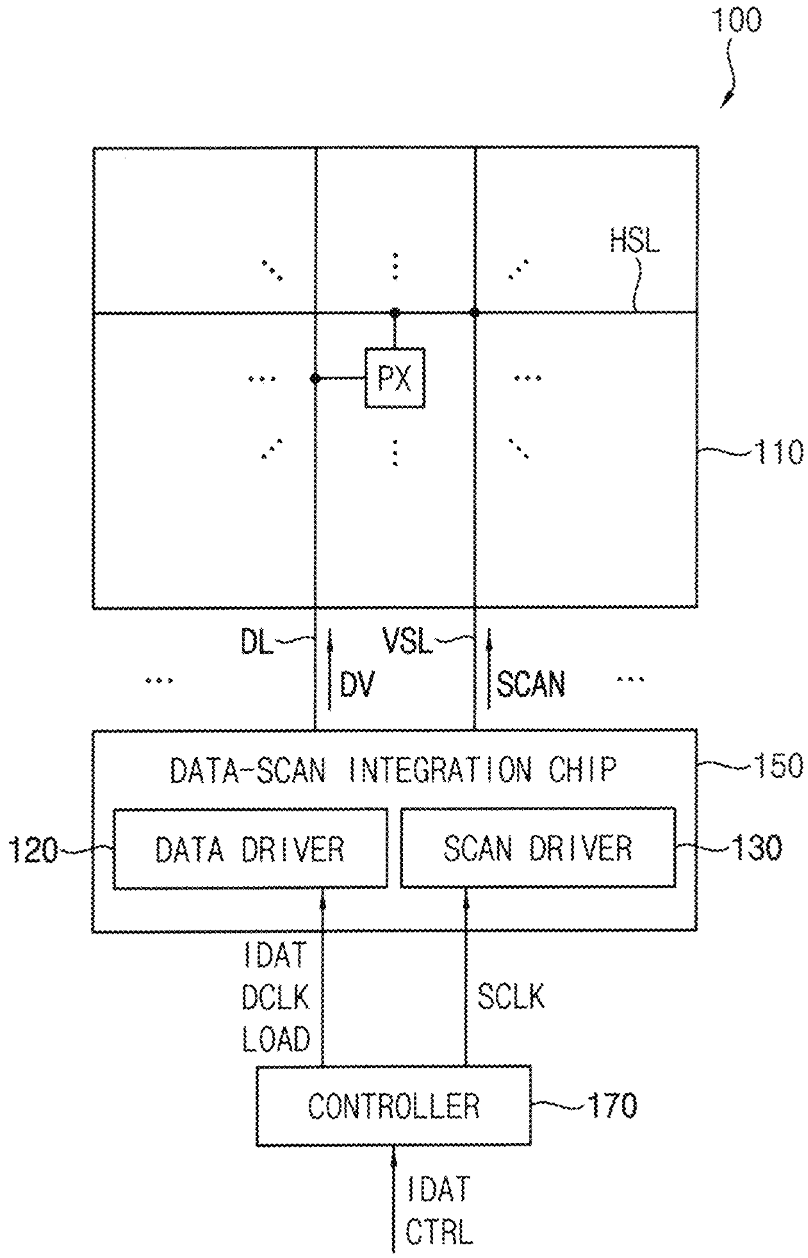
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

The embodiments are described more fully hereinafter with reference to the accompanying drawings. Like or similar reference numerals refer to like or similar elements throughout.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
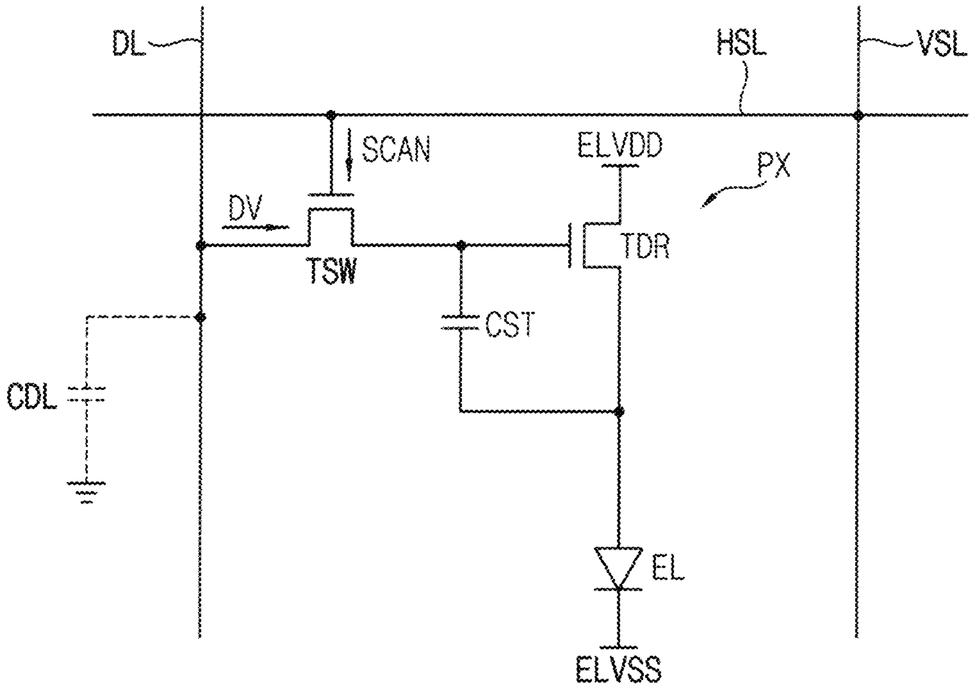
FIG. 2 is a circuit diagram illustrating a pixel included in a display device according to an embodiment.
Figure 3:
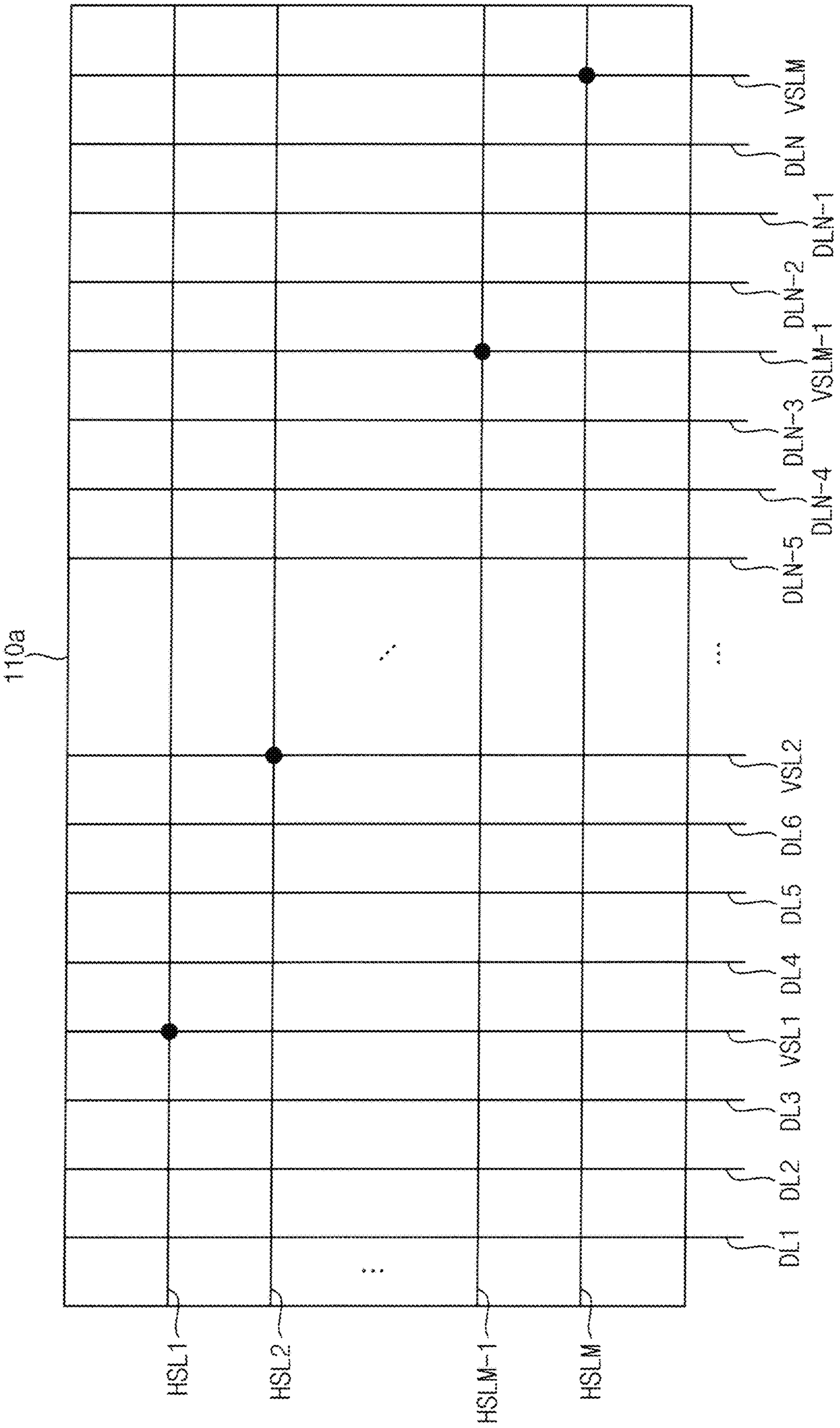
FIG. 3 is a diagram illustrating a display panel included in a display device according to an embodiment.
Figure 4:
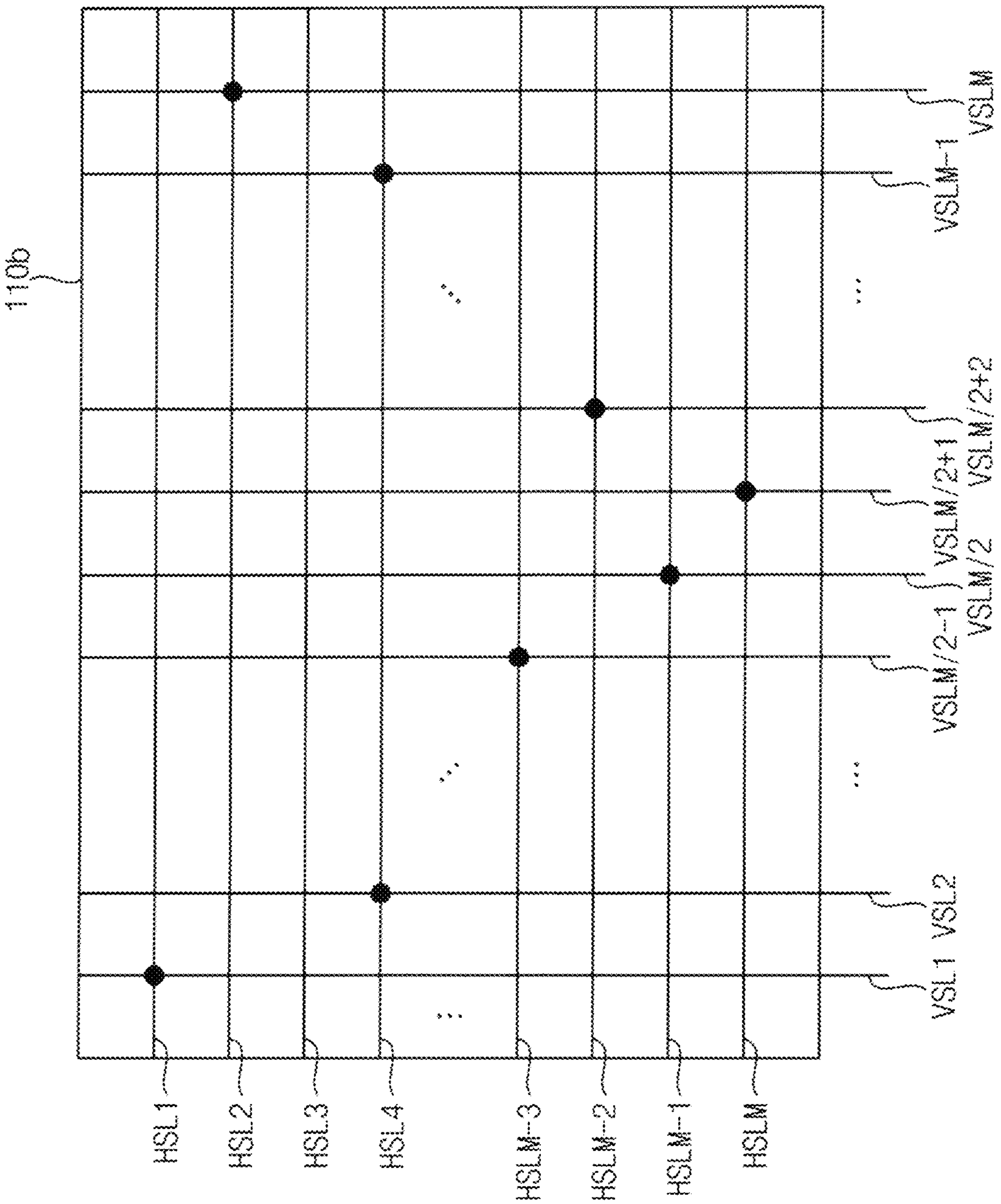
FIG. 4 is a diagram illustrating a display panel included in a display device according to an alternative embodiment.
Figure 5:
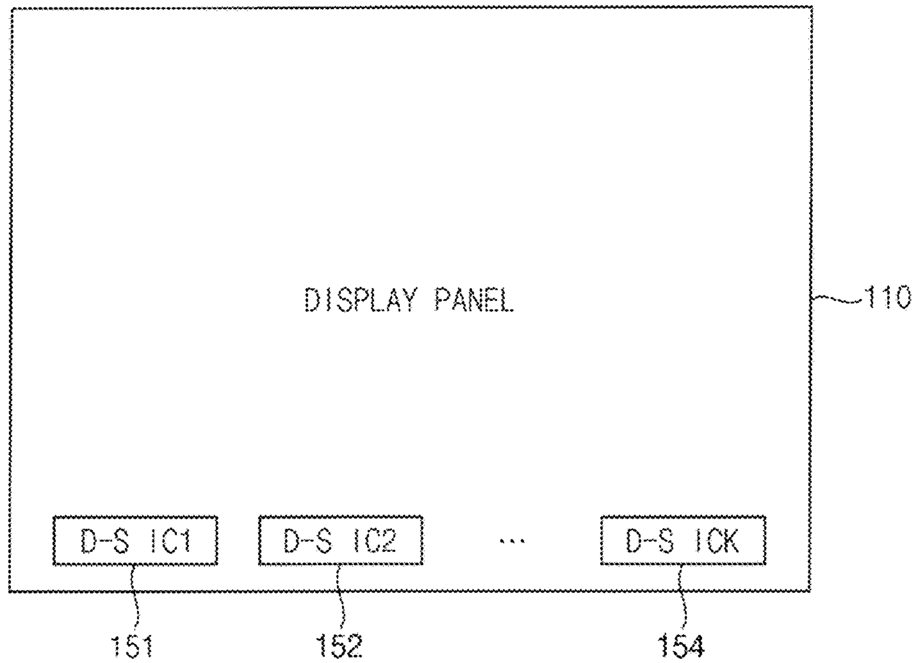
FIG. 5 is a diagram illustrating an embodiment where at least one data-scan integration chip is coupled to a display panel.
Figure 6:
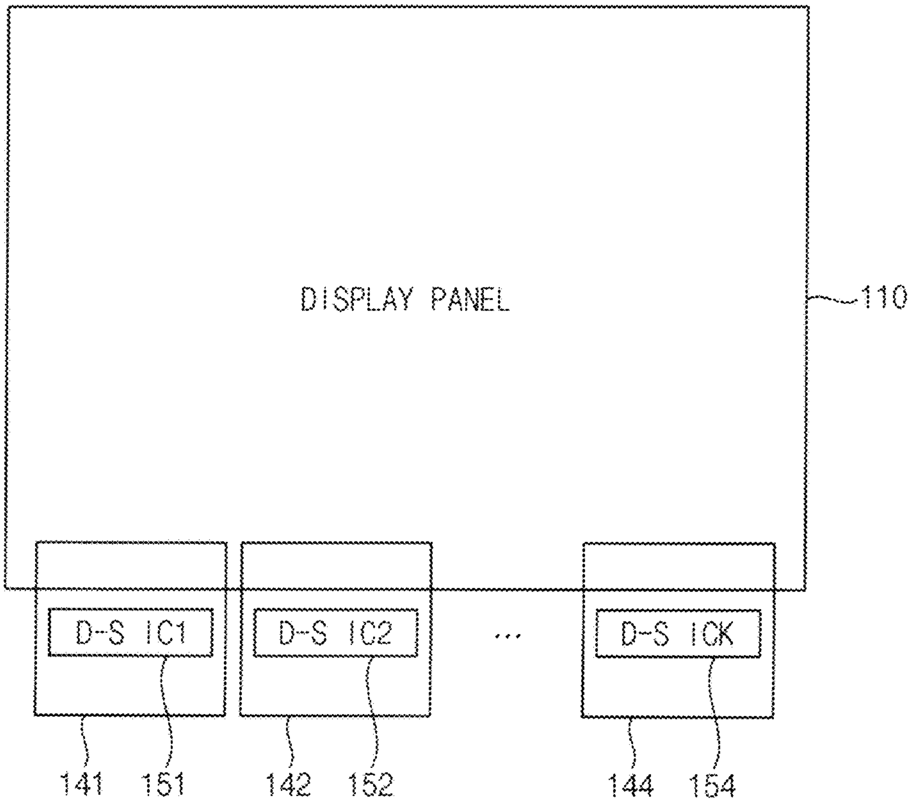
FIG. 6 is a diagram illustrating an alternative embodiment where at least one data-scan integration chip is coupled to a display panel.

FIG. 1 is a block diagram illustrating a display device according to an embodiment, FIG. 2 is a circuit diagram illustrating a pixel included in a display device according to an embodiment, FIG. 3 is a diagram illustrating a display panel included in a display device according to an embodiment, FIG. 4 is a diagram illustrating a display panel included in a display device according to an alternative embodiment, FIG. 5 is a diagram illustrating an embodiment where at least one data-scan integration chip is coupled to a display panel, and FIG. 6 is a diagram illustrating an alternative embodiment where at least one data-scan integration chip is coupled to a display panel.

Referring to FIG. 1, an embodiment of a display device 100 may include a display panel 110 that includes a plurality of pixels PX, a data driver 120 that provides data voltages DV to the plurality of pixels PX, a scan driver 130 that provides a scan signal SCAN to the plurality of pixels PX, and a controller 170 that controls the data driver 120 and the scan driver 130.

The display panel 110 may include the plurality of pixels PX, a plurality of data lines DL coupled to the plurality of pixels PX, a plurality of first scan lines HSL coupled to the plurality of pixels PX, and a plurality of second scan lines VSL coupled to the plurality of first scan lines HSL. The plurality of data lines DL may extend in a first direction, the plurality of first scan lines HSL may extend in a second direction different from the first direction, and the plurality of second scan lines VSL may extend in the first direction. In an embodiment, the first direction may be a vertical direction, the plurality of second scan lines VSL may be a plurality of vertical scan lines VSL, the second direction may be a horizontal direction, and the plurality of first scan lines HSL may be a plurality of horizontal scan lines HSL. Hereinafter, an embodiment where the first direction is the vertical direction and the second direction is the horizontal direction will be described below. Further, hereinafter, the first scan line HSL will be referred to as the horizontal scan line HSL, and the second scan line VSL will be referred to as the vertical scan line VSL.

In an embodiment, the display panel 110 may be an organic light emitting diode ("OLED") display panel where each pixel PX includes an OLED. In one embodiment, for example, as illustrated in FIG. 2, each pixel PX may include a driving transistor TDR, a switching transistor TSW, a storage capacitor CST and an OLED EL.

The storage capacitor CST may store the data voltage DV transferred through the data line DL. In an embodiment, the storage capacitor CST may include a first electrode coupled to a gate of the driving transistor TDR, and a second electrode coupled to a source of the driving transistor TDR.

The switching transistor TSW may transfer the data voltage DV of the data line DL to the first electrode of the storage capacitor CST in response to the scan signal SCAN received through the vertical scan line VSL and the horizontal scan line HSL from the scan driver 130. In an embodiment, in a first period, the data driver 120 may output the data voltage DV to the data line DL, and the data line DL and/or a parasitic capacitor CDL of the data line DL may be charged to have the data voltage DV. In a second period after the first period, the data line DL may be floated, the switching transistor TSW may transfer the data voltage DV charged at the data line DL, and the storage capacitor CST may store the data voltage DV. Further, in an embodiment, the switching transistor TSW may include a gate that receives the scan signal SCAN, a drain coupled to the data line DL, and a source coupled to the first electrode of the storage capacitor CST and the gate of the driving transistor TDR.

The driving transistor TDR may generate a driving current based on the data voltage DV stored in the storage capacitor CST. In an embodiment, the driving transistor TDR may include a gate coupled to the first electrode of the storage capacitor CST, a drain that receives a first power supply voltage ELVDD (e.g., a high power supply voltage), and a source coupled to the second electrode of the storage capacitor CST.

The organic light emitting diode EL may emit light based on the driving current generated by the driving transistor TDR. In an embodiment, the organic light emitting diode EL may include an anode coupled to the source of the driving transistor TDR, and a cathode that receives a second power supply voltage ELVSS (e.g., a low power supply voltage).

FIG. 2 illustrates an embodiment where each pixel PX has a two-transistor-one-capacitor ("2T1C") structure, but the pixel PX is not limited thereto. Alternatively, the pixel PX may have one of various configurations known in the art.

In an alternative embodiment, each pixel PX may include a switching transistor, and a liquid crystal capacitor coupled to the switching transistor, and the display panel 110 may be a liquid crystal display ("LCD") panel. However, the display panel 110 is not limited to the OLED display panel or the LCD panel, and may be another type of display panel known in the art.

In an embodiment, the plurality of horizontal scan lines HSL and the plurality of vertical scan lines VSL may be coupled to each other on a one-to-one basis, but the relationship between the horizontal scan lines HSL and the vertical scan lines VSL is not limited thereto. In one embodiment, for example, the number of the plurality of horizontal scan lines HSL may be substantially the same as the number of the plurality of vertical scan lines VSL.

FIG. 3 is a block diagram of an embodiment of a display panel 110*a* showing arrangements of the plurality of data lines DL, the plurality of horizontal scan lines HSL and the plurality of vertical scan lines VSL. The display panel 110*a* may include N data lines DL1, DL2, DL3, DL4, DL5, DL6, . . . , DLN−5, DLN−4, DLN−3, DLN−2, DLN−1 and DLN, M horizontal scan lines HSL1, HSL2, . . . , HSLM−1 and HSLM and M vertical scan lines VSL1, VSL2, . . . , VSLM−1 and VSLM, where N and M are integers greater than 1. The M horizontal scan lines HSL1 through HSLM may extend in the horizontal direction. The N data lines DL1 through DLN and the M vertical scan lines VSL1 through VSLM may extend in the vertical direction, and may be parallel with each other. In an embodiment, at least one data line of the N data lines DL1 through DLN may be disposed between adjacent two second scan lines of the M vertical scan lines VSL1 through VSLM. In one embodiment, for example, fourth, fifth and sixth data lines DL4, DL5 and DL6 may be disposed between a first vertical scan line VSL1 and a second vertical scan line VSL2, and (N−2)-th, (N−1)-th and N-th data lines DLN−2, DLN−1 and DLN may be disposed between an (M−1)-th vertical scan line VSLM−1 and an M-th vertical scan line VSLM. FIG. 3 illustrates an embodiment where three data lines (e.g., DL4, DL5 and DL6) are disposed between adjacent two vertical scan lines (e.g., VSL1 and VSL2), but the number of data lines disposed between adjacent two vertical scan lines is not limited to three.

In an embodiment, the M horizontal scan lines HSL1 through HSLM may be located or formed at a first layer, the M vertical scan lines VSL1 through VSLM may be located or formed at a second layer, and the M horizontal scan lines HSL1 through HSLM and the M vertical scan lines VSL1 through VSLM may be coupled to each other through M contact holes. In one embodiment, for example, as illustrated in FIG. 3, the M horizontal scan lines HSL1 through HSLM may be coupled to the M vertical scan lines VSL1 through VSLM, respectively. In this case, the M contact holes may be arranged, but not limited to, in a diagonal line within the display panel 110*a* as illustrated in FIG. 3.

FIG. 4 is a block diagram of an alternative embodiment of a display panel 110*b* showing connection relationships between the plurality of horizontal scan lines HSL and the plurality of vertical scan lines VSL. In one embodiment, for example, as illustrated in FIG. 4, odd-numbered horizontal scan lines HSL1, HSL3, . . . , HSLM−3 and HSLM−1 may be coupled to a left half of vertical scan lines VSL1, VSL2, . . . , VSLM/2−1 and VSLM/2, and even-numbered horizontal scan lines HSL2, HSL4, . . . , HSLM−2 and HSLM may be coupled to a right half of vertical scan lines VSLM/2+1, VSL M/2+2, . . . , VSLM−1 and VSLM. In such an embodiment, the M contact holes for connecting the M horizontal scan lines HSL1 through HSLM and the M vertical scan lines VSL1 through VSLM may be arranged in a V-shaped form within the display panel 110*b* as illustrated in FIG. 4, but not being limited thereto.

FIGS. 3 and 4 illustrate arrangements and connection relationships of the plurality of data lines DL, the plurality of horizontal scan lines HSL and the plurality of vertical scan lines VSL in embodiments of the display panel 110*a* and 110*b*, but the arrangements and the connection relationships of the lines DL, HSL and VSL of the display panel 110 are not limited to those shown in FIGS. 3 and 4.

Referring back to FIG. 1, the data driver 120 may generate the data voltages DV based on image data IDAT and a data control signal received from the controller 170, and may provide the data voltages DV to the plurality of pixels PX through the plurality of data lines. In an embodiment, the data control signal may include, but not limited to, a data clock signal DCLK and a load signal LOAD.

The scan driver 130 may generate the scan signal SCAN based on a scan control signal received from the controller 170, and may sequentially provide the scan signal SCAN to the plurality of pixels PX on a row-by-row basis through the plurality of vertical scan lines VSL and the plurality of horizontal scan lines HSL. In an embodiment, the scan control signal may include a scan clock signal SCLK. In an embodiment, the scan control signal may further include, but not limited to, a scan start signal.

In an embodiment, as illustrated in FIG. 1, since the scan driver 130 provides the scan signal SCAN to the plurality of pixels PX through the plurality of vertical scan lines VSL and the plurality of horizontal scan lines HSL, the data driver 120 may be located at one side (e.g., a bottom side) of the display panel 110, and the scan driver 130 also may be located at the one side at which the data driver 120 is located. Accordingly, a bezel width of the display panel 110 may be reduced at three sides of the display panel 110 at which the data driver 120 and the scan driver 130 are not located. Herein, a structure where the data driver 120 and the scan driver 130 are located at a same side of the display panel 110 may be referred to as a single side driving ("SSD") structure.

The data driver 120 and the scan driver 130 may be implemented with at least one data-scan integration chip 150 (or at least one data-scan integration integrated circuit ("IC")). Thus, a data-scan integration chip 150 may output not only the data voltages DV but also the scan signal SCAN. Accordingly, a chip size (or an IC size) of a chip (or an IC) for driving the display panel 110 may be reduced.

The at least one data-scan integration chip 150 may be coupled to the display panel 110. In an embodiment, as illustrated in FIG. 5, the data driver 120 and the scan driver 130 may be implemented with K data-scan integration chips 151, 152, . . . and 154, where K is an integer greater than 0, and the K data-scan integration chips 151, 152, . . . and 154 may be mounted on the display panel 110 in a chip-on-glass ("COG") manner or a chip-on-plastic ("COP") manner. In an alternative embodiment, as illustrated in FIG. 6, K films 141, 142, . . . and 144 may be coupled to the display panel 110, and the K data-scan integration chips 151, 152, . . . and 154 may be coupled to the display panel 110 through the K films 141, 142, . . . and 144 in a chip-on-film ("COF") manner.

Figure 9:
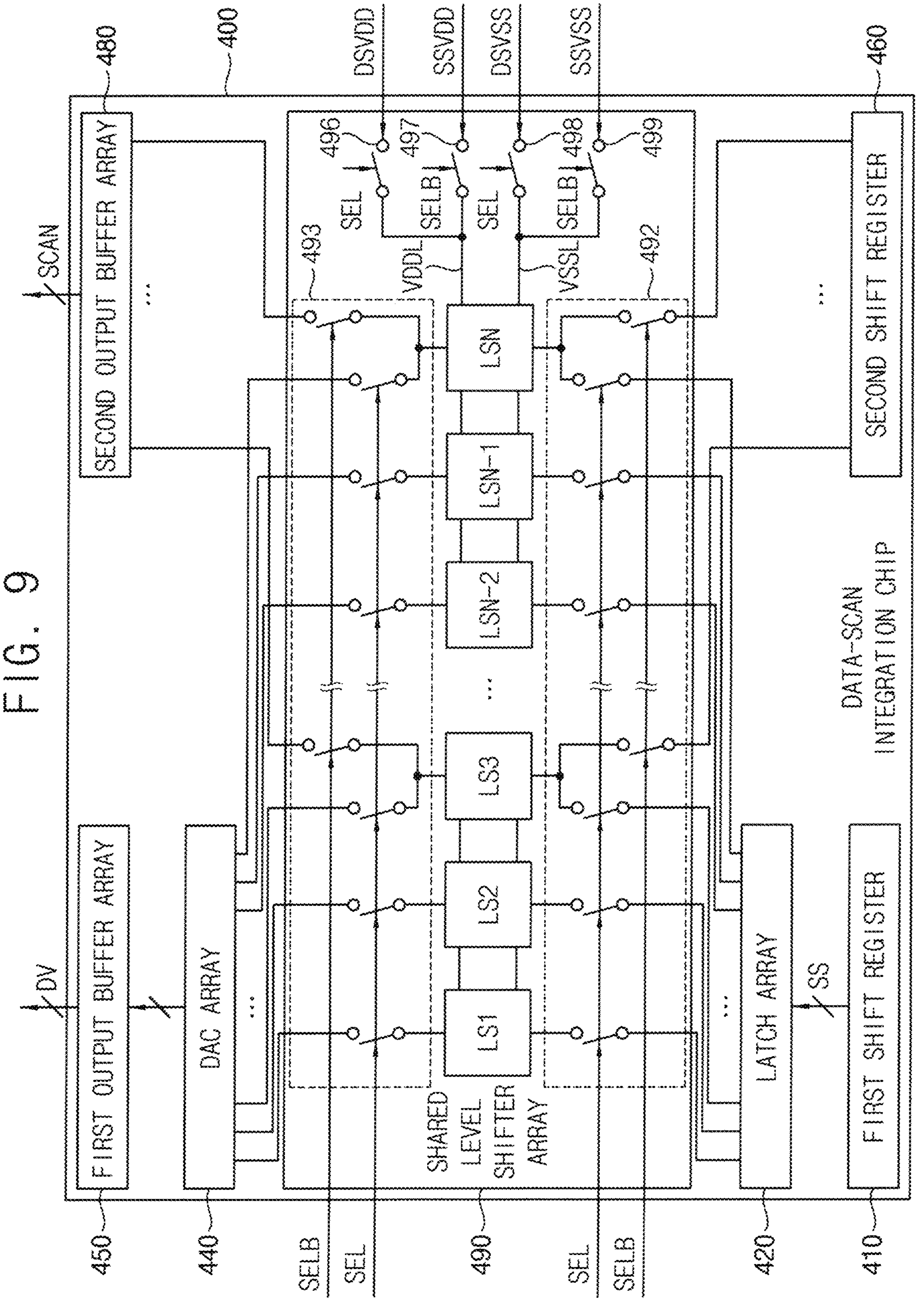
FIG. 9 is a block diagram illustrating a data-scan integration chip according to an alternative embodiment.
Figure 12:
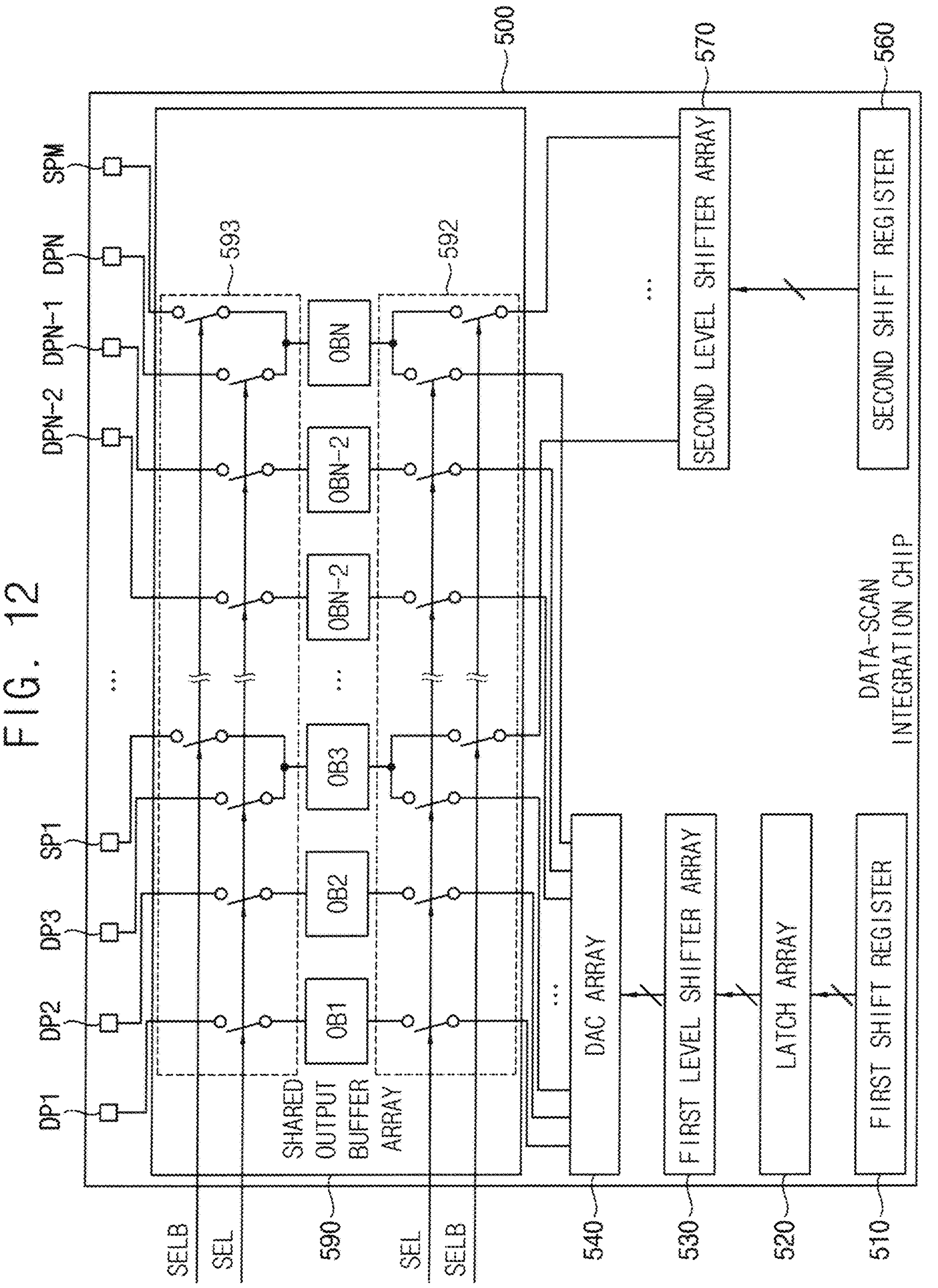
FIG. 12 is a block diagram illustrating a data-scan integration chip according to another alternative embodiments.
Figure 14:
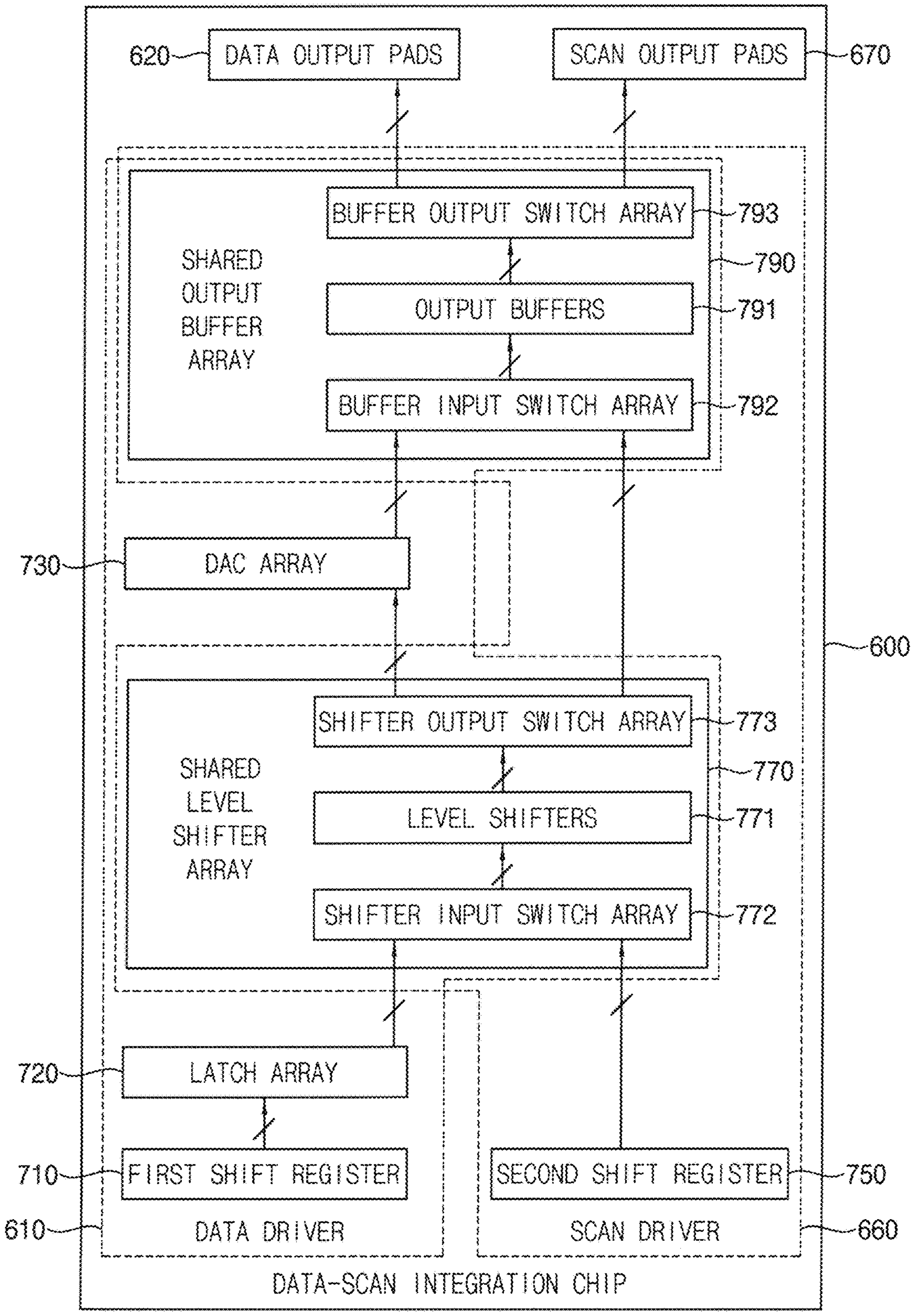
FIG. 14 is a block diagram illustrating a data-scan integration chip according to another alternative embodiments.

In an embodiment, the data-scan integration chip 150 may include at least one component shared by the data driver 120 and the scan driver 130. In an embodiment, as illustrated in FIG. 9, a data-scan integration chip 400 may include a shared level shifter array 490 shared by the data driver 120 and the scan driver 130. In an alternative embodiment, as illustrated in FIG. 12, a data-scan integration chip 500 may include a shared output buffer array 590 shared by the data driver 120 and the scan driver 130. In another alternative embodiment, as illustrated in FIG. 14, a data-scan integration chip 500 may include a shared level shifter array 770 and a shared output buffer array 790 shared by the data driver 120 and 610 and the scan driver 130 and 660. In such an embodiment, the chip size (or the IC size) of the chip (or the IC) for driving the display panel 110 may be further reduced, and power consumption may be reduced.

The controller 170 (e.g., a timing controller) may receive image data IDAT and a control signal CTRL from an external host processor (e.g., a graphic processing unit ("GPU"), an application processor ("AP") or a graphic card). In an embodiment, the image data IDAT may be RGB image data including red image data, green image data and blue image data. In an embodiment, the control signal CTRL may include, but not limited to, a vertical synchronization signal, a horizontal synchronization signal, a data enable signal, a master clock signal, etc. In an embodiment, the controller 170 may perform image processing on the image data IDAT received from the external host processor, and may provide the data driver 120 with the image data IDAT on which the image processing is performed. In an embodiment, the controller 170 may generate the data control signal and the scan control signal based on the control signal CTRL. The controller 170 may control an operation of the data driver 120 by providing the image data IDAT and the data control signal to the data driver 120, and may control an operation of the scan driver 130 by providing the scan control signal to the scan driver 130.

As described above, in an embodiment of the display device 100 according to the invention, the data driver 120 and the scan driver 130 may be located at a same side of the display panel 110. Accordingly, the bezel width of the display panel 110 may be reduced. In such an embodiment of the display device 100, the data driver 120 and the scan driver 130 may be implemented in the data-scan integration chip 150. Accordingly, the chip size (or the IC size) of the chip (or the IC) for driving the display panel 110 may be reduced. In an embodiment, at least one component of the data-scan integration chip 150 may be shared by the data driver 120 and the scan driver 130, such that the chip size (or the IC size) may be further reduced, and the power consumption may be reduced.

Figure 7:
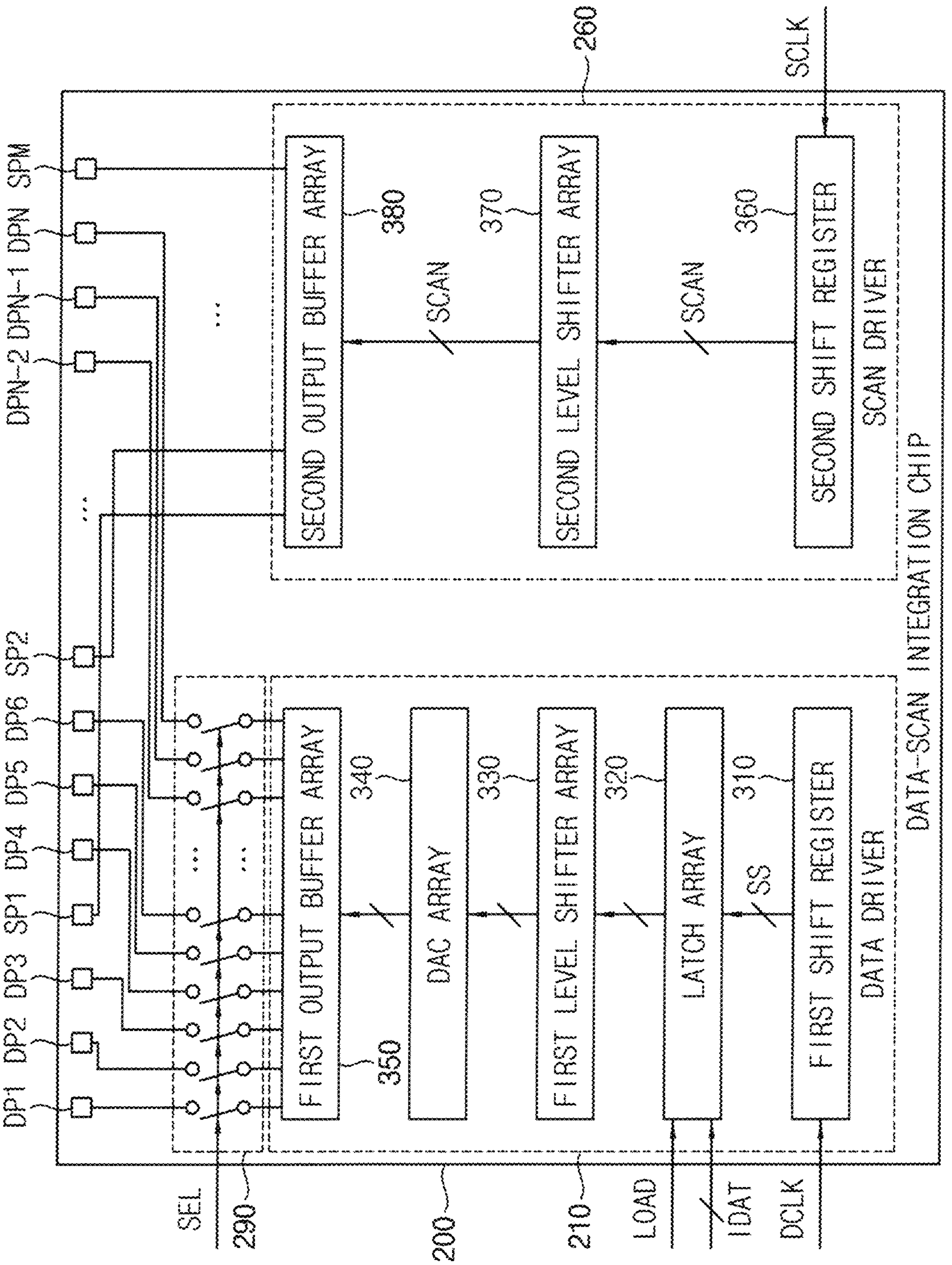
FIG. 7 is a block diagram illustrating a data-scan integration chip according to an embodiment.
Figure 8:
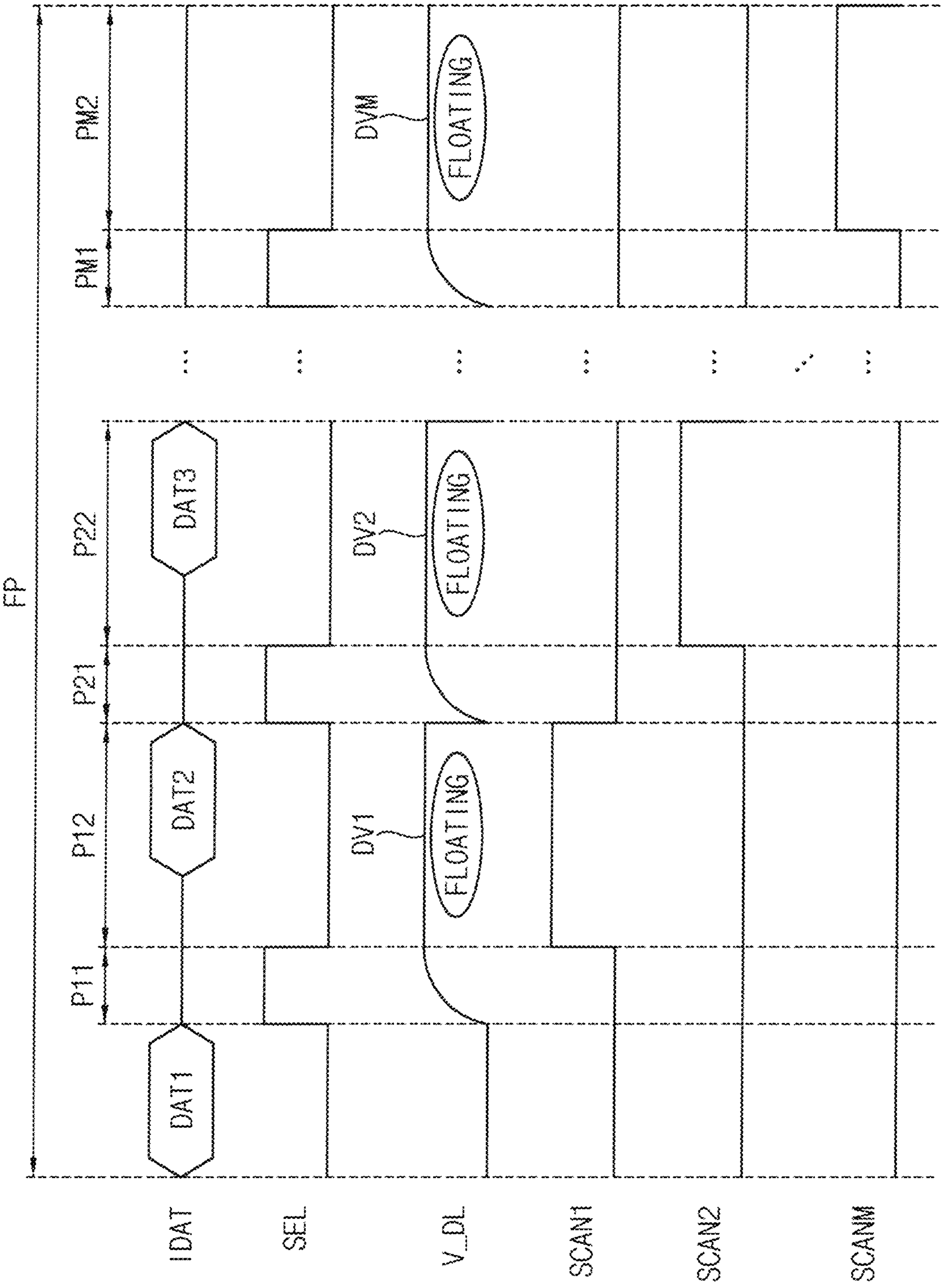
FIG. 8 is a timing diagram of signals for an operation of a data-scan integration chip according to an embodiment.

FIG. 7 is a block diagram illustrating a data-scan integration chip according to an embodiment, and FIG. 8 is a timing diagram of signals for an operation of a data-scan integration chip according to an embodiment.

Referring to FIG. 7, an embodiment of a data-scan integration chip 200 may include a first shift register 310, a latch array 320, a first level shifter array 330, a digital-to-analog converter ("DAC") array 340 and a first output buffer array 350 for a data driver 210, the data-scan integration chip 200 may further include a second shift register 360, a second level shifter array 370 and a second output buffer array 380 for a scan driver 260, and the data-scan integration chip 200 may further include a data output switch array 290, a plurality of data output pads DP1, DP2, DP3, DP4, DP5, DP6, . . . , DPN−2, DPN−1 and DPN and a plurality of scan output pads SP1, SP2, . . . and SPM.

The plurality of data output pads DP1 through DPN may be coupled to a plurality of data lines of a display panel, and the plurality of scan output pads SP1 through SPM may be coupled to a plurality of vertical scan lines of the display panel. In an embodiment, the data-scan integration chip 200 may include N data output pads DP1 through DPN and M scan output pads SP1 through SPM, where N and M are integers greater than 1. Here, N is greater than M, but values of N and M are limited thereto. In an embodiment, at least one data output pad of the N data output pads DP1 through DPN may be disposed between adjacent two scan output pads of the M scan output pads SP1 through SPM. In one embodiment, for example, fourth, fifth and sixth data output pads DP4, DP5 and DP6 may be disposed between a first scan output pad SP1 and a second scan output pad SP2. FIG. 7 illustrates an embodiment where three data output pads (e.g., DP4, DP5 and DP6) are disposed between adjacent two scan output pads (e.g., SP1 and SP2), but the number of data output pads disposed between adjacent two scan output pads is not limited to three.

The first shift register 310 may sequentially generate a sampling signal SS based on a data clock signal DCLK. In an embodiment, the first shift register 310 may include, but not limited to, a plurality of flip-flops that sequentially generates the sampling signal SS.

The latch array 320 may store the image data IDAT in response to the sampling signal SS, and may output latch output signals, or the image data IDAT for one row of pixels in response to the load signal LOAD. In an embodiment, the latch array 320 may include a plurality of sampling latches that sequentially stores the image data IDAT in response to the sampling signal SS, and/or a plurality of holding latches that stores and outputs the image data IDAT for the one row of pixels stored in the plurality of sampling latches in response to the load signal LOAD.

The first level shifter array 330 may shift voltage levels of the latch output signals output from the latch array 320. In one embodiment, for example, the first level shifter array 330 may shift the voltage levels of the latch output signals to voltages levels suitable for the DAC array 340. In an embodiment, the first level shifter array 330 may include a plurality of level shifters that performs a shifting operation.

The DAC array 340 may perform a digital-to-analog conversion operation on shifter output signals output from the first level shifter array 330. In an embodiment, the DAC array 340 may include a plurality of DACs that performs the digital-to-analog conversion operation.

The first output buffer array 350 may output, as data voltages DV illustrated in FIG. 1, converter output signals output from the DAC array 340. In an embodiment, the first output buffer array 350 may include a plurality of output buffers for buffering the data voltages DV.

The data output switch array 290 may selectively couple the first output buffer array 350 to the plurality of data output pads DP1 through DPN in response to a selection signal SEL. In an embodiment, the data output switch array 290 may include a plurality of switches that performs a connection operation in response to the selection signal SEL. According to an embodiment, the selection signal SEL may be generated by a controller 170 illustrated in FIG. 1, or may be generated in the data-scan integration chip 200.

The selection signal SEL may have a high level in a first period, and may have a low level in a second period after the first period. In response to the selection signal SEL, the data output switch array 290 may couple the first output buffer array 350 to the plurality of data output pads DP1 through DPN in the first period, and the data output switch array 290 may decouple the first output buffer array 350 from the plurality of data output pads DP1 through DPN in the second period. Accordingly, the data-scan integration chip 200 may output the data voltages DV to a plurality of data lines DL illustrated in FIG. 1 in the first period, and may make the plurality of data lines DL be floated in the second period after the first period.

The second shift register 360 may sequentially generate a scan signal SCAN based on a scan clock signal SCLK. In an embodiment, the second shift register 360 may include, but not limited to, a plurality of stages that sequentially generates the scan signal SCAN.

The second level shifter array 370 may shift a voltage level of the scan signal SCAN output from the second shift register 360. In one embodiment, for example, the second level shifter array 370 may shift the voltage level of the scan signal SCAN to a voltages level suitable for switching transistors of a plurality of pixels. In an embodiment, the second level shifter array 370 may include a plurality of level shifters that performs a shifting operation.

The second output buffer array 380 may output the scan signal SCAN output from the second level shifter array 370. In an embodiment, the second output buffer array 380 may include a plurality of output buffers for buffering the scan signal SCAN.

The scan signal SCAN output by the second output buffer array 380 may be provided to a plurality of vertical scan lines VSL illustrated in FIG. 1 through the plurality of scan output pads SP1 through SPM, and the scan signal SCAN provided to the plurality of vertical scan lines VSL may be provided to the plurality of pixels through a plurality of horizontal scan lines HSL illustrated in FIG. 1.

Hereinafter, an operation of the data-scan integration chip 200 according to an embodiment will be described with reference to FIGS. 1, 2, 3, 7 and 8.

Referring to FIGS. 1, 2, 3, 7 and 8, each frame period FP may include first periods P11, P21, . . . and PM1 at which the data voltages DV for the plurality of pixels PX are output, and second periods P12, P22, . . . and PM2 in which the data voltages DV are stored in the plurality of pixels PX. In each first period P11 through PM1, the data-scan integration chip 200 may output the data voltages DV for a selected row of pixels PX to the plurality of data lines DL, and the data voltages DV may be charged at the plurality of data lines DL. Further, in a corresponding second period P12 through PM2 after each first period P11 through PM1, the data-scan integration chip 200 may make the plurality of data lines DL be floated, the data-scan integration chip 200 may output the scan signal SCAN to a vertical scan line VSL corresponding to the selected row, and thus the data voltages DV charged at the plurality of data lines DL may be stored in the selected row of pixels PX.

In one embodiment, for example, as illustrated in FIG. 8, the controller 170 may provide, as the image data IDAT, image data DAT1 for a first row of pixels PX to the data-scan integration chip 200. The first shift register 310 may generate the sampling signal SS, and the latch array 320 may sequentially store the image data DAT1 for the first row of pixels PX in response to the sampling signal SS.

In a first period P11 for the first row of pixels PX, the latch array 320 may output the image data DAT1 for the first row of pixels PX in response to the load signal LOAD, the first level shifter array 330 may shift voltage levels of the image data DAT1 for the first row of pixels PX, the DAC array 340 may convert the image data DAT1 for the first row of pixels PX into first data voltages DV1 for the first row of pixels PX, the first output buffer array 350 may output the first data voltages DV1 for the first row of pixels PX, and the data output switch array 290 may couple the first output buffer array 350 to the plurality of data output pads DP1 through DPN in response to the selection signal SEL having the high level. Thus, in the first period P11 for the first row of pixels PX, the first data voltages DV1 for the first row of pixels PX may be output to the plurality of data lines DL through the plurality of data output pads DP1 through DPN. Accordingly, the plurality of data lines DL and/or parasitic capacitors CDL of the plurality of data lines DL may be charged such that voltages V_DL of the plurality of data lines DL may become the first data voltages DV1.

In a second period P12 for the first row of pixels PX after the first period P11, the selection signal SEL may have the low level, and the data output switch array 290 may decouple the first output buffer array 350 from the plurality of data output pads DP1 through DPN in response to the selection signal SEL having the low level. Accordingly, the plurality of data lines DL charged to have the first data voltages DV1 may be floated. Further, the second shift register 360 may generate a first scan signal SCAN1 for the first row of pixels PX based on the scan clock signal SCLK, the second level shifter array 370 may shift a voltage level of the first scan signal SCAN1, and the second output buffer array 380 may output the first scan signal SCAN1. Thus, in the second period P12 for the first row of pixels PX, the first scan signal SCAN1 may be provided to the first row of pixels PX through a first scan output pad SP1, a first vertical scan line VSL1 and a first horizontal scan line HSL1. Accordingly, during the second period P12 for the first row of pixels PX, storage capacitors CST of the first row of pixels PX may store the first data voltages DV1 charged at the plurality of data lines DL. Further, within the second period P12 for the first row of pixels PX, the latch array 320 may store image data DAT2 for a second row of pixels PX.

In a first period P21 for the second row of pixels PX after the second period P12, the first output buffer array 350 may output second data voltages DV2 for the second row of pixels PX, and the data output switch array 290 may couple the first output buffer array 350 to the plurality of data output pads DP1 through DPN in response to the selection signal SEL having the high level. Accordingly, in the first period P21 for the second row of pixels PX, the plurality of data lines DL and/or the parasitic capacitors CDL of the plurality of data lines DL may be charged such that the voltages V_DL of the plurality of data lines DL may become the second data voltages DV2.

In a second period P22 for the second row of pixels PX after the first period P21, the data output switch array 290 may decouple the first output buffer array 350 from the plurality of data output pads DP1 through DPN in response to the selection signal SEL having the low level, and the plurality of data lines DL charged to have the second data voltages DV2 may be floated. Further, the second shift register 360, the second level shifter array 370 and the second output buffer array 380 may output a second scan signal SCAN2. Thus, in the second period P22 for the second row of pixels PX, the second scan signal SCAN2 may be provided to the second row of pixels PX through a second scan output pad SP2, a second vertical scan line VSL2 and a second horizontal scan line HSL2. Accordingly, during the second period P22 for the second row of pixels PX, the storage capacitors CST of the second row of pixels PX may store the second data voltages DV2 charged at the plurality of data lines DL. Further, within the second period P22 for the second row of pixels PX, the latch array 320 may store image data DAT3 for a third row of pixels PX.

In such an embodiment, in a first period PM1 for an M-th row of pixels PX, the plurality of data lines DL and/or the parasitic capacitors CDL of the plurality of data lines DL may be charged such that the voltages V_DL of the plurality of data lines DL may become M-th data voltages DVM. In such an embodiment, in a second period PM2 for the M-th row of pixels PX after the first period PM1, the plurality of data lines DL charged to have the M-th data voltages DVM may be floated. In such an embodiment, the second shift register 360, the second level shifter array 370 and the second output buffer array 380 may output an M-th scan signal SCANM. Thus, in the second period PM2 for the M-th row of pixels PX, the M-th scan signal SCANM may be provided to the M-th row of pixels PX through an M-th scan output pad SPM, an M-th vertical scan line VSLM and an M-th horizontal scan line HSLM. Accordingly, during the second period PM2 for the M-th row of pixels PX, the storage capacitors CST of the M-th row of pixels PX may store the M-th data voltages DVM charged at the plurality of data lines DL. In such an embodiment, as described above, the data voltages DV may be sequentially stored in the plurality of pixels PX on a row-by-row basis, and the plurality of pixels PX may emit light based on the stored data voltages DV.

Figure 10:
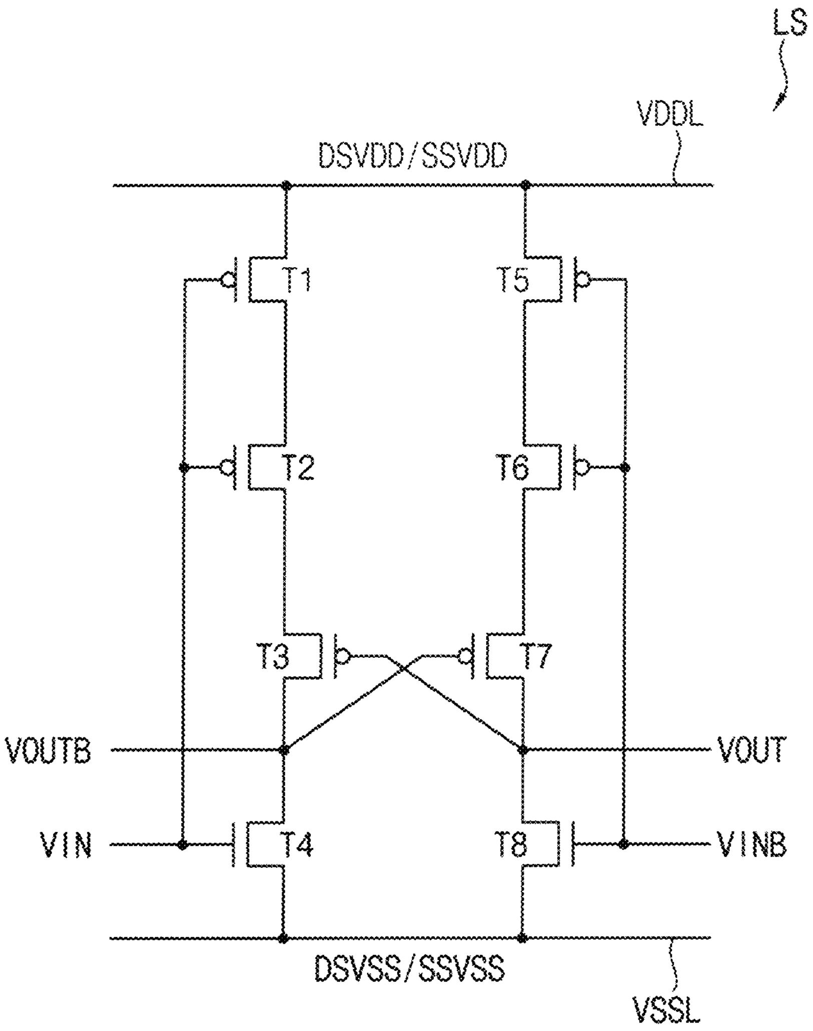
FIG. 10 is a circuit diagram illustrating a level shifter included in a data-scan integration chip according to an embodiment.
Figure 11:
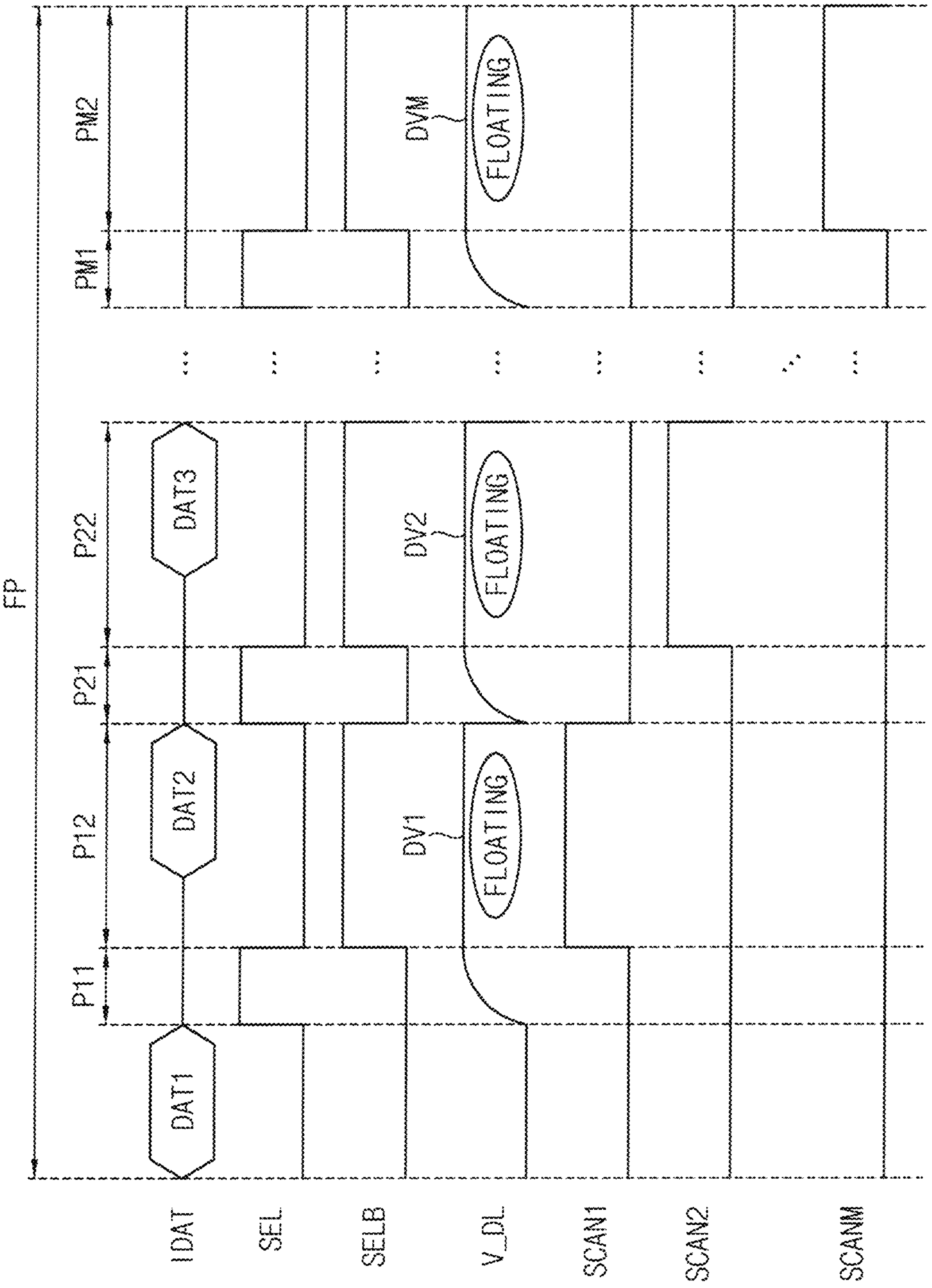
FIG. 11 is a timing diagram showing an operation of a data-scan integration chip according to an embodiment.

FIG. 9 is a block diagram illustrating a data-scan integration chip according to an alternative embodiment, FIG. 10 is a circuit diagram illustrating a level shifter included in a data-scan integration chip according to an embodiment, and FIG. 11 is a timing diagram showing an operation of a data-scan integration chip according to an embodiment.

Referring to FIG. 9, an embodiment of a data-scan integration chip 400 may include a first shift register 410, a latch array 420, a DAC array 440 and a first output buffer array 450 for a data driver, the data-scan integration chip 400 may further include a second shift register 460 and a second output buffer array 480 for a scan driver, and the data-scan integration chip 400 may further include a shared level shifter array 490 that is shared by the data driver and the scan driver. The data-scan integration chip 400 of FIG. 9 may have a similar configuration and a similar operation to a data-scan integration chip 200 of FIG. 7, except that the data-scan integration chip 400 may include the shared level shifter array 490 instead of a first level shifter array 330 and a second level shifter array 370. In an embodiment, although it is not illustrated in FIG. 9, the data-scan integration chip 400 may further include a data output switch array 290 of FIG. 7 that selectively couples the first output buffer array 450 to a plurality of data output pads in response to a selection signal SEL.

The shared level shifter array 490 may include a plurality of level shifters LS1, LS2, LS3, . . . , LSN−2, LSN−1 and LSN, a shifter input switch array 492 and a shifter output switch array 493. In an embodiment, where a display device may include N data lines and M vertical scan lines, and N is greater than M, the shared level shifter array 490 may include N level shifters LS1 through LSN. In an embodiment where the data-scan integration chip 200 includes the first level shifter array 330 for the data driver and the second level shifter array 370 for the scan driver as illustrated in FIG. 7, the data-scan integration chip 200 may include N+M level shifters. In an alternative embodiment, the data-scan integration chip 400 includes the shared level shifter array 490 that is shared by the data driver and the scan driver, such that the data-scan integration chip 400 may include only the N level shifters LS1 through LSN, and thus a chip size (or an IC size) of the data-scan integration chip 400 may be further reduced.

In an embodiment, as illustrated in FIG. 10, each level shifter LS may include first, second and third transistors T1, T2 and T3 coupled in series between a high power supply line VDDL and an inverted output terminal at which an inverted output voltage VOUTB is output, a fourth transistor T4 coupled between the inverted output terminal and a low power supply line VSSL, fifth, sixth and seventh transistors T5, T6 and T7 coupled in series between the high power supply line VDDL and an output terminal at which an output voltage VOUT is output, and an eighth transistor T8 coupled between the output terminal and the low power supply line VSSL. The first, second, third, fifth, sixth and seventh transistors T1, T2, T3, T5, T6 and T7 may be implemented with p-type metal-oxide-semiconductor ("PMOS") transistors, and the fourth and eighth transistors T4 and T8 may be implemented with n-type metal-oxide-semiconductor ("NMOS") transistors. The first and second transistors T1 and T2 may be turned on in response to an input voltage VIN having a low level, the third transistor T3 may be turned in response to the output voltage VOUT having a low level, and the eighth transistor T8 may be turned in response to the inverted output voltage VOUTB having a high level. Thus, in response to the input voltage VIN having the low level and the inverted output voltage VOUTB having the high level, the level shifter LS may output a low power supply voltage DSVSS/SSVSS of the low power supply line VSSL and a high power supply voltage DSVDD/SSVDD of the high power supply line VDDL as the output voltage VOUT and the inverted output voltage VOUTB, respectively. In such an embodiment, the fifth and sixth transistors T5 and T6 may be turned on in response to the inverted output voltage VOUTB having a low level, the seventh transistor T7 may be turned in response to the inverted output voltage VOUTB having a low level, and the fourth transistor T4 may be turned in response to having a high level. Thus, in response to the input voltage VIN having the high level and the inverted output voltage VOUTB having the low level, the level shifter LS may output the high power supply voltage DSVDD/SSVDD of the high power supply line VDDL and the low power supply voltage DSVSS/SSVSS of the low power supply line VSSL as the output voltage VOUT and the inverted output voltage VOUTB, respectively. FIG. 10 illustrates an embodiment of the level shifter LS that receives differential input voltages VIN and VINB and outputs differential output voltages VOUT and VOUTB, an input and an output of the level shifter LS are not limited thereto. In one alternative embodiment, for example, the level shifter LS may receive a single-ended input signal, and may output a single-ended output signal. FIG. 10 illustrates a configuration of an embodiment of the level shifter LS, but the configuration of the level shifter LS included in the data-scan integration chip 400 is not limited thereto.

Referring back to FIG. 9, the shifter input switch array 492 may couple output terminals of the latch array 420 to input terminals of the plurality of level shifters LS1 through LSM in response to the selection signal SEL, and may couple output terminals of the second shift register 460 to the input terminals of the plurality of level shifters LS1 through LSM in response to an inverted selection signal SELB. In an embodiment, the shifter input switch array 492 may include N input switches that perform a connection operation in response to the selection signal SEL, and M input switches that perform a connection operation in response to the inverted selection signal SELB. In such an embodiment, the shifter output switch array 493 may couple output terminals of the plurality of level shifters LS1 through LSM to input terminals of the DAC array 440 in response to the selection signal SEL, and may couple the output terminals of the plurality of level shifters LS1 through LSM to input terminals of the second output buffer array 480 in response to the inverted selection signal SELB. In an embodiment, the shifter output switch array 493 may include N output switches that perform a connection operation in response to the selection signal SEL, and M output switches that perform a connection operation in response to the inverted selection signal SELB. Accordingly, the shared level shifter array 490 may be coupled between the latch array 420 and the DAC array 440 for the data driver while the selection signal SEL has a high level, and may be coupled between the second shift register 460 and the second output buffer array 480 for the scan driver while the inverted selection signal SELB has a high level.

In an embodiment, the shared level shifter array 490 may further include a first shifter high power supply switch 496 that transfers a data shifter high power supply voltage DSVDD to the high power supply line VDDL of the shared level shifter array 490 in response to the selection signal SEL, a second shifter high power supply switch 497 that transfers a scan shifter high power supply voltage SSVDD to the high power supply line VDDL of the shared level shifter array 490 in response to the inverted selection signal SELB, a first shifter low power supply switch 498 that transfers a data shifter low power supply voltage DSVSS to the low power supply line VSSL of the shared level shifter array 490 in response to the selection signal SEL, and a second shifter low power supply switch 499 that transfers a scan shifter low power supply voltage SSVSS to the low power supply line VSSL of the shared level shifter array 490 in response to the inverted selection signal SELB. Accordingly, the plurality of level shifters LS1 through LSM may be supplied with the data shifter high power supply voltage DSVDD and the data shifter low power supply voltage DSVSS for level shifters of the data driver while the selection signal SEL has the high level, and may be supplied with the scan shifter high power supply voltage SSVDD and the scan shifter low power supply voltage SSVSS for level shifters of the scan driver while the inverted selection signal SELB has the high level.

As described above, an embodiment of the data-scan integration chip 400 may include the shared level shifter array 490 shared by the data driver and the scan driver. Accordingly, the chip size (or the IC size) of the data-scan integration chip 400 may be further reduced, and the power consumption may be reduced.

Hereinafter, an operation of the data-scan integration chip 400 according to an embodiment will be described with reference to FIGS. 9 and 11.

Referring to FIGS. 9 and 11, in a first period P11 for a first row of pixels, the selection signal SEL may have a high level, and the inverted selection signal SELB may have a low level. Accordingly, the shared level shifter array 490 may be coupled between the latch array 420 and the DAC array 440. Accordingly, the data-scan integration chip 400 may output first data voltages DV1 for the first row of pixels to a plurality of data lines, and the plurality of data lines may be charged to have the first data voltages DV1 for the first row of pixels.

In a second period P12 for the first row of pixels after the first period P11, the selection signal SEL may have the low level, and the inverted selection signal SELB may have the high level. Accordingly, the shared level shifter array 490 may be coupled between the second shift register 460 and the second output buffer array 480. In such an embodiment, the plurality of data lines charged to have the first data voltages DV1 may be floated by the data output switch array 290 illustrated in FIG. 7. The data-scan integration chip 400 may provide a first scan signal SCAN1 to the first row of pixels, and the first row of pixels may store the first data voltages DV1 charged at the plurality of data lines.

In a first period P21 for a second row of pixels after the second period P12, the selection signal SEL may have the high level, the inverted selection signal SELB may have the low level, and the shared level shifter array 490 may be coupled between the latch array 420 and the DAC array 440. The data-scan integration chip 400 may output second data voltages DV2 for the second row of pixels to the plurality of data lines, and the plurality of data lines may be charged to have the second data voltages DV2 for the second row of pixels. In a second period P22 for the second row of pixels after the first period P21, the selection signal SEL may have the low level, the inverted selection signal SELB may have the high level, the shared level shifter array 490 may be coupled between the second shift register 460 and the second output buffer array 480, and the plurality of data lines may be floated. The data-scan integration chip 400 may provide a second scan signal SCAN2 to the second row of pixels, and the second row of pixels may store the second data voltages DV2 charged at the plurality of data lines.

In such an embodiment, in a first period PM1 for an M-th row of pixels, the selection signal SEL may have the high level, the inverted selection signal SELB may have the low level, and the shared level shifter array 490 may be coupled between the latch array 420 and the DAC array 440. The data-scan integration chip 400 may output M-th data voltages DVM for the M-th row of pixels to the plurality of data lines, and the plurality of data lines may be charged to have the M-th data voltages DVM for the M-th row of pixels. In a second period PM2 for the M-th row of pixels after the first period PM1, the selection signal SEL may have the low level, the inverted selection signal SELB may have the high level, the shared level shifter array 490 may be coupled between the second shift register 460 and the second output buffer array 480, and the plurality of data lines may be floated. The data-scan integration chip 400 may provide an M-th scan signal SCANM to the M-th row of pixels, and the M-th row of pixels may store the M-th data voltages DVM charged at the plurality of data lines. In such an embodiment, as described above, the data voltages DV1, DV2, . . . and DVM may be sequentially stored in the plurality of pixels on a row-by-row basis, and the plurality of pixels may emit light based on the stored data voltages DV1, DV2, . . . and DVM.

Figure 13:
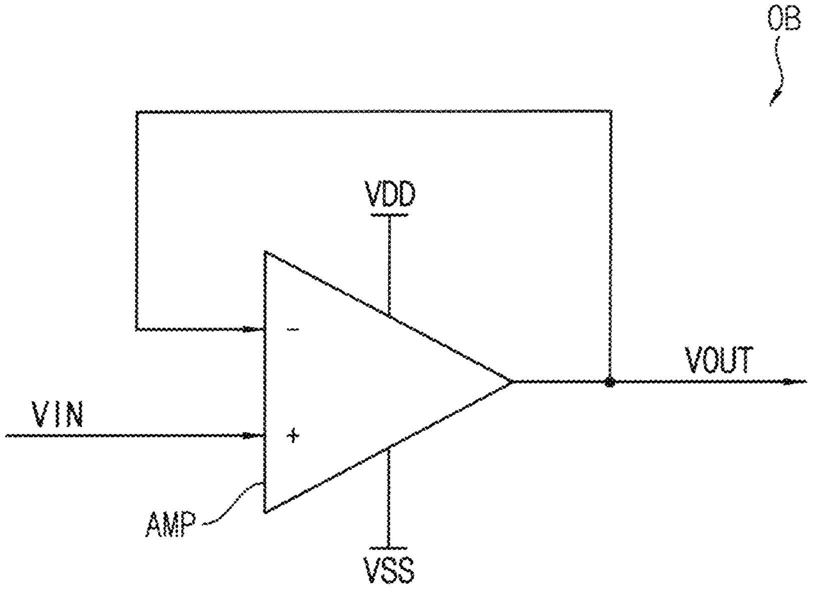
FIG. 13 is a circuit diagram illustrating an output buffer included in a data-scan integration chip according to an embodiments.

FIG. 12 is a block diagram illustrating a data-scan integration chip according to another alternative embodiment, and FIG. 13 is a circuit diagram illustrating an output buffer included in a data-scan integration chip according to an embodiment.

Referring to FIG. 12, an embodiment of a data-scan integration chip 500 may include a first shift register 510, a latch array 520, a first level shifter array 530 and a DAC array 540 for a data driver, the data-scan integration chip 500 may further include a second shift register 560 and a second level shifter array 370 for a scan driver, and the data-scan integration chip 500 may further include a shared output buffer array 590 that is shared by the data driver and the scan driver. The data-scan integration chip 500 of FIG. 12 may have a similar configuration and a similar operation to a data-scan integration chip 200 of FIG. 7, except that the data-scan integration chip 500 may include the shared output buffer array 590 instead of a first output buffer array 350 and a second output buffer array 380.

The shared output buffer array 590 may include a plurality of output buffers OB1, OB2, OB3, . . . , OBN−2, OBN−1 and OBN, a buffer input switch array 592 and a buffer output switch array 593. In an embodiment, where a display device may include N data lines and M vertical scan lines, and N is greater than M, the shared output buffer array 590 may include N output buffers OB1 through OBN. In an embodiment where the data-scan integration chip 200 includes the first output buffer array 350 for the data driver and the second output buffer array 380 for the scan driver as illustrated in FIG. 7, the data-scan integration chip 200 may include N+M output buffers. In an alternative embodiment, the data-scan integration chip 500 includes the shared output buffer array 590 that is shared by the data driver and the scan driver, such that the data-scan integration chip 500 may include only the N output buffers OB1 through OBN, and thus a chip size (or an IC size) of the data-scan integration chip 500 may be further reduced.

In an embodiment, as illustrated in FIG. 13, each output buffer OB may include an amplifier AMP having an input terminal, an inverted input terminal and an output terminal. The amplifier AMP may receive an input voltage VIN at the input terminal, and the inverted input terminal and the output terminal may be coupled to each other. The amplifier AMP may output an output voltage VOUT substantially the same as the input voltage VIN at the output terminal. Further, the amplifier AMP may be supplied with a high power supply voltage VDD and a low power supply voltage VSS. In an embodiment, a voltage level of the high power supply voltage VDD of the amplifier AMP may be determined as a voltage level of a higher one of a data buffer high power supply voltage for an output buffer for the data driver and a scan buffer high power supply voltage for an output buffer for the scan driver, and a voltage level of the low power supply voltage VSS of the amplifier AMP may be determined as a voltage level of a lower one of a data buffer low power supply voltage for the output buffer for the data driver and a scan buffer low power supply voltage for the output buffer for the scan driver. Accordingly, each output buffer OB may serve as both of the output buffer for the data driver and the output buffer for the scan driver. FIG. 13 illustrates a configuration of an embodiment of the output buffer OB, the configuration of the output buffer OB included in the data-scan integration chip 500 is not limited thereto.

Referring back to FIG. 12, the buffer input switch array 592 may couple output terminals of the DAC array 540 to input terminals of the plurality of output buffers OB1 through OBN in response to a selection signal SEL, and may couple output terminals of the second level shifter array 570 to the input terminals of the plurality of output buffers OB1 through OBN in response to an inverted selection signal SELB. In an embodiment, the buffer input switch array 592 may include N input switches that perform a connection operation in response to the selection signal SEL, and M input switches that perform a connection operation in response to the inverted selection signal SELB. In such an embodiment, the buffer output switch array 593 may couple output terminals of the plurality of output buffers OB1 through OBN to a plurality of data output pads DP1 through DPN in response to the selection signal SEL, and may couple the output terminals of the plurality of output buffers OB1 through OBN to a plurality of scan output pads SP1 through SPM in response to the inverted selection signal SELB. In an embodiment, the buffer output switch array 593 may include N output switches that perform a connection operation in response to the selection signal SEL, and M output switches that perform a connection operation in response to the inverted selection signal SELB. Accordingly, the shared output buffer array 590 may be coupled between the DAC array 540 and the plurality of data output pads DP1 through DPN for the data driver while the selection signal SEL has a high level, and may be coupled between the second level shifter array 570 and the plurality of scan output pads SP1 through SPM for the scan driver while the inverted selection signal SELB has a high level.

In an embodiment, as described above, the data-scan integration chip 500 may include the shared output buffer array 590 shared by the data driver and the scan driver. Accordingly, the chip size (or the IC size) of the data-scan integration chip 500 may be further reduced, and the power consumption may be reduced.

Hereinafter, an operation of the data-scan integration chip 500 according to an embodiment will be described with reference to FIGS. 11 and 12.

Referring to FIGS. 11 and 12, in a first period P11 for a first row of pixels, the selection signal SEL may have a high level, the inverted selection signal SELB may have a low level, and the shared output buffer array 590 may be coupled between the DAC array 540 and the plurality of data output pads DP1 through DPN. The data-scan integration chip 500 may output first data voltages DV1 for the first row of pixels to a plurality of data lines, and the plurality of data lines may be charged to have the first data voltages DV1 for the first row of pixels. In a second period P12 for the first row of pixels after the first period P11, the selection signal SEL may have the low level, and the inverted selection signal SELB may have the high level, the shared output buffer array 590 may be coupled between the second level shifter array 570 and the plurality of scan output pads SP1 through SPM, and the plurality of data lines may be floated. The data-scan integration chip 500 may provide a first scan signal SCAN1 to the first row of pixels, and the first row of pixels may store the first data voltages DV1 charged at the plurality of data lines.

In a first period P21 for a second row of pixels after the second period P12, the selection signal SEL may have the high level, the inverted selection signal SELB may have the low level, and the shared output buffer array 590 may be coupled between the DAC array 540 and the plurality of data output pads DP1 through DPN. The data-scan integration chip 500 may output second data voltages DV2 for the second row of pixels to the plurality of data lines, and the plurality of data lines may be charged to have the second data voltages DV2 for the second row of pixels. In a second period P22 for the second row of pixels after the first period P21, the selection signal SEL may have the low level, the inverted selection signal SELB may have the high level, the shared output buffer array 590 may be coupled between the second level shifter array 570 and the plurality of scan output pads SP1 through SPM, and the plurality of data lines may be floated. The data-scan integration chip 500 may provide a second scan signal SCAN2 to the second row of pixels, and the second row of pixels may store the second data voltages DV2 charged at the plurality of data lines.

In such an embodiment, in a first period PM1 for an M-th row of pixels, the selection signal SEL may have the high level, the inverted selection signal SELB may have the low level, and the shared output buffer array 590 may be coupled between the DAC array 540 and the plurality of data output pads DP1 through DPN. The data-scan integration chip 500 may output M-th data voltages DVM for the M-th row of pixels to the plurality of data lines, and the plurality of data lines may be charged to have the M-th data voltages DVM for the M-th row of pixels. In a second period PM2 for the M-th row of pixels after the first period PM1, the selection signal SEL may have the low level, the inverted selection signal SELB may have the high level, the shared output buffer array 590 may be coupled between the second level shifter array 570 and the plurality of scan output pads SP1 through SPM, and the plurality of data lines may be floated. The data-scan integration chip 500 may provide an M-th scan signal SCANM to the M-th row of pixels, and the M-th row of pixels may store the M-th data voltages DVM charged at the plurality of data lines. In such an embodiment, as described above, the data voltages DV1, DV2, . . . and DVM may be sequentially stored in the plurality of pixels on a row-by-row basis, and the plurality of pixels may emit light based on the stored data voltages DV1, DV2, . . . and DVM.

FIG. 14 is a block diagram illustrating a data-scan integration chip according to another alternative embodiment.

Referring to FIG. 14, an embodiment of a data-scan integration chip 600 may include a first shift register 710, a latch array 720 and a DAC array 730 for a data driver 610, the data-scan integration chip 600 may further include a second shift register 750 for a scan driver 660, and the data-scan integration chip 600 may further include a shared level shifter array 770 and a shared output buffer array 790 that are shared by the data driver 610 and the scan driver 660. The data-scan integration chip 600 of FIG. 14 may have a similar configuration and a similar operation to a data-scan integration chip 200 of FIG. 7, except that the data-scan integration chip 600 may include the shared level shifter array 770 instead of a first level shifter array 330 and a second level shifter array 370, and may include the shared output buffer array 790 instead of a first output buffer array 350 and a second output buffer array 380.

The shared level shifter array 770 may include a plurality of level shifters 771, a shifter input switch array 772 and a shifter output switch array 773. The shifter input switch array 772 may couple output terminals of the latch array 720 to input terminals of the plurality of level shifters 771 in response to a selection signal, and may couple output terminals of the second shift register 750 to the input terminals of the plurality of level shifters 771 in response to an inverted selection signal. The shifter output switch array 773 may couple output terminals of the plurality of level shifters 771 to input terminals of the DAC array 730 in response to the selection signal, and may couple the output terminals of the plurality of level shifters 771 to input terminals of the shared output buffer array 790 in response to the inverted selection signal.

The shared output buffer array 790 may include a plurality of output buffers 791, a buffer input switch array 792 and a buffer output switch array 793. The buffer input switch array 792 may couple output terminals of the DAC array 730 to input terminals of the plurality of output buffers 791 in response to the selection signal, and may couple output terminals of the shared level shifter array 770 to the input terminals of the plurality of output buffers 791 in response to the inverted selection signal. The buffer output switch array 793 may couple output terminals of the plurality of output buffers 791 to a plurality of data output pads 620 in response to the selection signal, and may couple the output terminals of the plurality of output buffers 791 to a plurality of scan output pads 670 in response to the inverted selection signal.

In an embodiment, as described above, the data-scan integration chip 600 may include the shared level shifter array 770 and the shared output buffer array 790 shared by the data driver 610 and the scan driver 660. Accordingly, the chip size (or the IC size) of the data-scan integration chip 600 may be further reduced, and the power consumption may be reduced.

Figure 15:
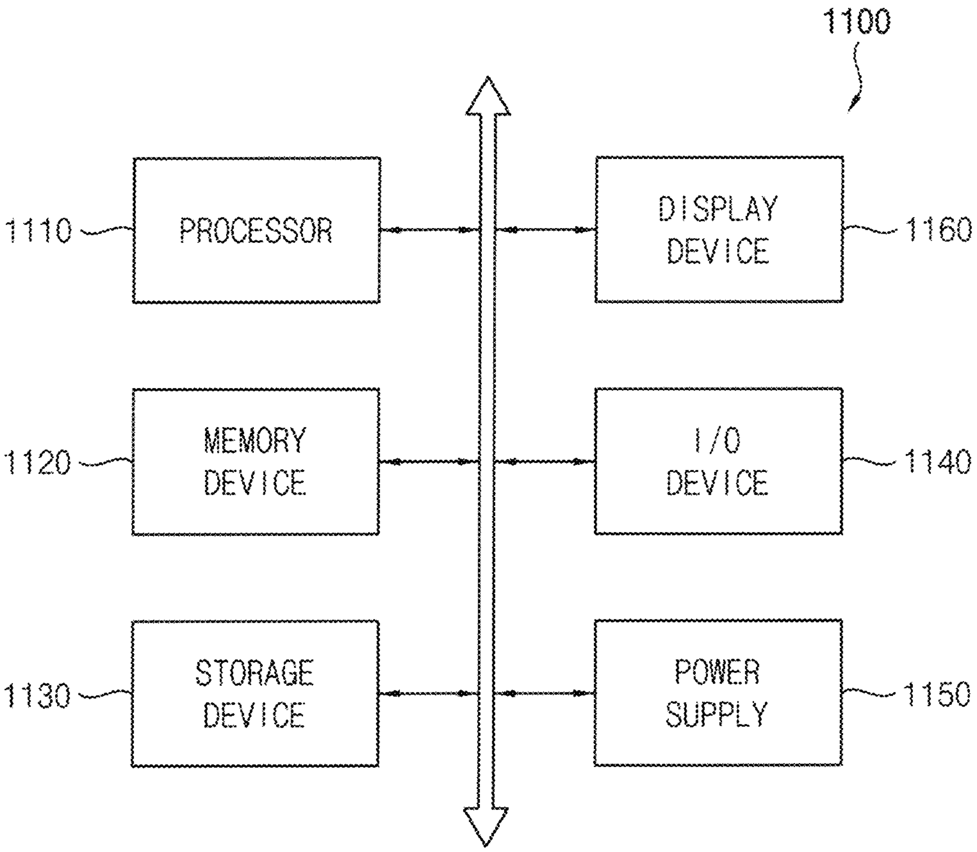
FIG. 15 is a block diagram illustrating an electronic device including a display device according to an embodiment.

FIG. 15 is a block diagram illustrating an electronic device including a display device according to embodiments.

Referring to FIG. 15, an embodiment of an electronic device 1100 may include a processor 1110, a memory device 1120, a storage device 1130, an input/output ("I/O") device 1140, a power supply 1150, and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor or a central processing unit ("CPU"), for example. The processor 1110 may be coupled to other components via an address bus, a control bus, a data bus, etc. In an embodiment, the processor 1110 may be further coupled to an extended bus such as a peripheral component interconnection ("PCP") bus.

The memory device 1120 may store data for operations of the electronic device 1100. In one embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In an embodiment of the display device 1160, a data driver and a scan driver may be located at a same side of a display panel. Accordingly, a bezel width of the display panel may be reduced. In such an embodiment of the display device 1160, the data driver and the scan driver may be implemented with a data-scan integration chip. Accordingly, a chip size (or an IC size) of a chip (or an IC) for driving the display panel may be reduced. In such an embodiment, at least one component (e.g., a level shifter array and/or an output buffer array) of the data-scan integration chip may be shared by the data driver and the scan driver. Accordingly, the chip size (or the IC size) may be further reduced, and power consumption may be reduced.

According to embodiments, the electronic device 1100 may be any electronic device including the display device 1160, such as a digital television, a three-dimensional ("3D") television, a personal computer ("PC"), a home appliance, a laptop computer, a cellular phone, a smart phone, a tablet computer, a wearable device, a personal digital assistant ("PDA"), a portable multimedia player ("PMP"), a digital camera, a music player, a portable game console, a navigation system, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A device for driving a display panel, the device comprising:

a data driver which provides data voltages to the display panel; and a scan driver which provides a scan signal to the display panel, wherein at least one of a level shifter array and an output buffer array is shared by the data driver and the scan driver, wherein the data driver and the scan driver are implemented with a data-scan integration chip which outputs the data voltages and the scan signal, the data-scan integration chip includes a first shift register, a latch array and a digital-to-analog converter array for the data driver, the data-scan integration chip further includes a second shift register for the scan driver, and the data-scan integration chip further includes at least one of the shared level shifter array and the shared output buffer array which is shared by the data driver and the scan driver.

2. The device of claim 1, further comprising:

a plurality of data output pads coupled to a plurality of data lines of the display panel; and a plurality of scan output pads coupled to a plurality of scan lines of the display panel.

3. The device of claim 2, wherein at least one data output pad of the plurality of data output pads is disposed between adjacent two scan output pads of the plurality of scan output pads.

4. The device of claim 1, wherein, in a first period, the device outputs data voltages for a selected row of pixels of the display panel to a plurality of data lines of the display panel, and wherein, in a second period after the first period, the device makes the plurality of data lines be floated, and outputs the scan signal to a scan line of the display panel corresponding to the selected row.

5. The device of claim 4, wherein the data voltages are charged at the plurality of data lines during the first period, and wherein the data voltages charged at the plurality of data lines are stored in the selected row of pixels during the second period.

6. The device of claim 1, wherein the shared level shifter array includes:

a plurality of level shifters;

a shifter input switch array which couples output terminals of the latch array to input terminals of the plurality of level shifters in response to a selection signal, and couples output terminals of the second shift register to the input terminals of the plurality of level shifters in response to an inverted selection signal; and a shifter output switch array which couples output terminals of the plurality of level shifters to input terminals of the digital-to-analog converter array in response to the selection signal, and couples the output terminals of the plurality of level shifters to input terminals of the second output buffer array in response to the inverted selection signal.

7. The device of claim 6, wherein the shared level shifter array further includes:

a first shifter high power supply switch which transfers a data shifter high power supply voltage to a high power supply line of the shared level shifter array in response to the selection signal;

a second shifter high power supply switch which transfers a scan shifter high power supply voltage to the high power supply line of the shared level shifter array in response to the inverted selection signal;

a first shifter low power supply switch which transfers a data shifter low power supply voltage to a low power supply line of the shared level shifter array in response to the selection signal; and a second shifter low power supply switch which transfers a scan shifter low power supply voltage to the low power supply line of the shared level shifter array in response to the inverted selection signal.

8. The device of claim 1, wherein the data-scan integration chip further includes a plurality of data output pads coupled to a plurality of data lines of the display panel, and a plurality of scan output pads coupled to a plurality of scan lines of the display panel, and the shared output buffer array includes:

a plurality of output buffers;

a buffer input switch array which couples output terminals of the digital-to-analog converter array to input terminals of the plurality of output buffers in response to a selection signal, and couples output terminals of the second level shifter array to the input terminals of the plurality of output buffers in response to an inverted selection signal; and a buffer output switch array which couples output terminals of the plurality of output buffers to the plurality of data output pads in response to the selection signal, and couples the output terminals of the plurality of output buffers to the plurality of scan output pads in response to the inverted selection signal.

9. The device of claim 8, wherein a voltage level of a high power supply voltage of the plurality of output buffers is determined as a voltage level of a higher one of a data buffer high power supply voltage and a scan buffer high power supply voltage, and wherein a voltage level of a low power supply voltage of the plurality of output buffers is determined as a voltage level of a lower one of a data buffer low power supply voltage and a scan buffer low power supply voltage.

10. The device of claim 1, wherein the data-scan integration chip further includes a plurality of data output pads coupled to a plurality of data lines of the display panel, and a plurality of scan output pads coupled to a plurality of scan lines of the display panel, wherein the shared level shifter array includes:

a plurality of level shifters;

a shifter input switch array which couples output terminals of the latch array to input terminals of the plurality of level shifters in response to a selection signal, and couples output terminals of the second shift register to the input terminals of the plurality of level shifters in response to an inverted selection signal; and a shifter output switch array which couples output terminals of the plurality of level shifters to input terminals of the digital-to-analog converter array in response to the selection signal, and couples the output terminals of the plurality of level shifters to input terminals of the shared output buffer array in response to the inverted selection signal, and wherein the shared output buffer array includes:

a plurality of output buffers;

a buffer input switch array which couples output terminals of the digital-to-analog converter array to input terminals of the plurality of output buffers in response to the selection signal, and couples output terminals of the shared level shifter array to the input terminals of the plurality of output buffers in response to the inverted selection signal; and a buffer output switch array which couples output terminals of the plurality of output buffers to the plurality of data output pads in response to the selection signal, and couples the output terminals of the plurality of output buffers to the plurality of scan output pads in response to the inverted selection signal.

11. A device for driving a display panel, the device comprising:

a data driver which provides data voltages to the display panel;

a scan driver which provides a scan signal to the display panel; and a controller which controls the data driver and the scan driver, wherein at least one of a level shifter array and an output buffer array is shared by the data driver and the scan driver, wherein the device includes a first shift register, a latch array and a digital-to-analog converter array for the data driver, the device further includes a second shift register for the scan driver, and the device further includes at least one of the shared level shifter array and the shared output buffer array which is shared by the data driver and the scan driver.

12. The device of claim 11, further comprising:

a plurality of data output pads coupled to a plurality of data lines of the display panel; and a plurality of scan output pads coupled to a plurality of scan lines of the display panel.

13. The device of claim 12, wherein at least one data output pad of the plurality of data output pads is disposed between adjacent two scan output pads of the plurality of scan output pads.

14. The device of claim 11, wherein the device is implemented with a single chip which outputs the data voltages and the scan signal.

* * * * *